(12) United States Patent  (10) Patent No.: US 7,765,740 B2
Heuel et al.  (45) Date of Patent: Aug. 3, 2010

(54) SLIDING DOOR FOR A VEHICLE

(75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 0 days.

(21) Appl. No.: 11/999,786

(22) Filed: Dec. 6, 2007

(65) Prior Publication Data
US 2009/0000200 A1    Jan. 1, 2009

(30) Foreign Application Priority Data
Jun. 28, 2007  (DE) .................. 10 2007 029 816
Jul. 27, 2007   (DE) .................. 10 2007 035 231

(51) Int. Cl.
*E05F 11/00* (2006.01)

(52) U.S. Cl. ................ 49/360; 49/248; 49/216; 296/146.12; 296/155

(58) Field of Classification Search ............ 49/249, 49/209, 212, 216, 218, 248, 250, 339, 345, 49/360; 16/289, 366, 370; 296/146.12, 155
See application file for complete search history.

(56) References Cited

U.S. PATENT DOCUMENTS

| | | | | | |
|---|---|---|---|---|---|
| 1,552,723 | A | * | 9/1925 | Mielenz | 49/248 |
| 3,006,683 | A | * | 10/1961 | Smith | 49/248 |
| 3,113,338 | A | * | 12/1963 | Westiund | 49/250 |
| 3,234,584 | A | * | 2/1966 | Valade | 16/370 |
| 3,935,674 | A | * | 2/1976 | Williams et al. | 49/212 |
| 4,738,003 | A | * | 4/1988 | Mori et al. | 16/321 |
| 5,140,770 | A | * | 8/1992 | Morvan | 49/215 |
| 5,921,613 | A | * | 7/1999 | Breunig et al. | 296/155 |
| 6,183,039 | B1 | * | 2/2001 | Kohut et al. | 296/155 |
| 6,330,734 | B1 | * | 12/2001 | Cho | 16/376 |
| 6,382,705 | B1 | * | 5/2002 | Lang et al. | 296/146.12 |
| 6,892,423 | B2 | * | 5/2005 | Cheal et al. | 16/289 |
| 2006/0267375 | A1 | * | 11/2006 | Enomoto | 296/155 |

FOREIGN PATENT DOCUMENTS

EP  1721768  11/2006

* cited by examiner

*Primary Examiner*—Katherine W Mitchell
*Assistant Examiner*—Catherine A Kelly
(74) *Attorney, Agent, or Firm*—Alleman Hall McCoy Russell & Tuttle LLP

(57) ABSTRACT

A sliding door for a vehicle comprises a guide rail, a sliding carriage which is longitudinally displaceably on the guide rail and a hinge bow which is rotatably supported at the sliding carriage and at a body flange. To improve such a sliding door, an intermediate layer is provided which is rotatably supported at the sliding carriage, a control lever which is rotatably supported at the intermediate lever and at a body flange and a drive rod for the drive of the control lever.

9 Claims, 29 Drawing Sheets

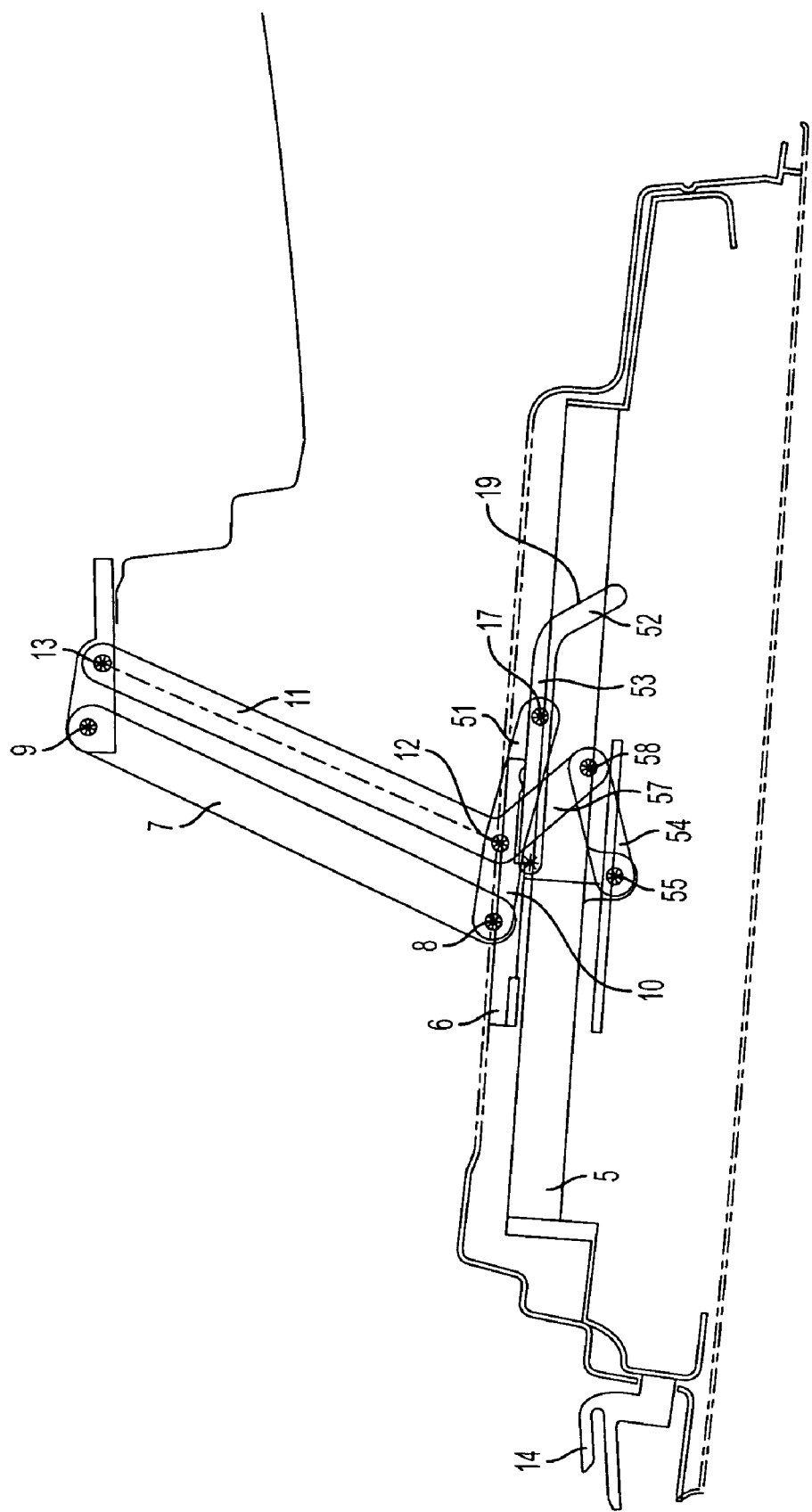

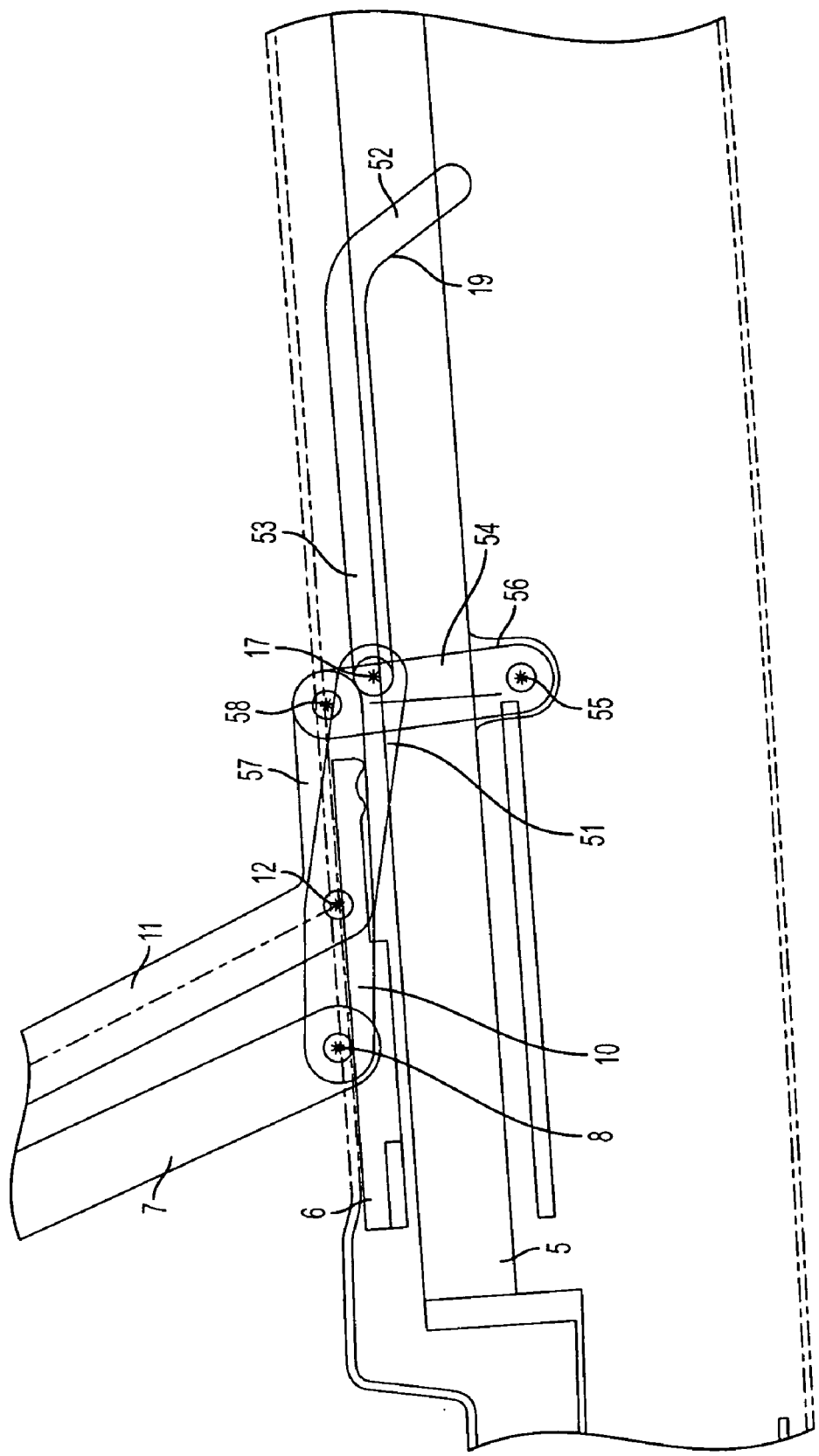

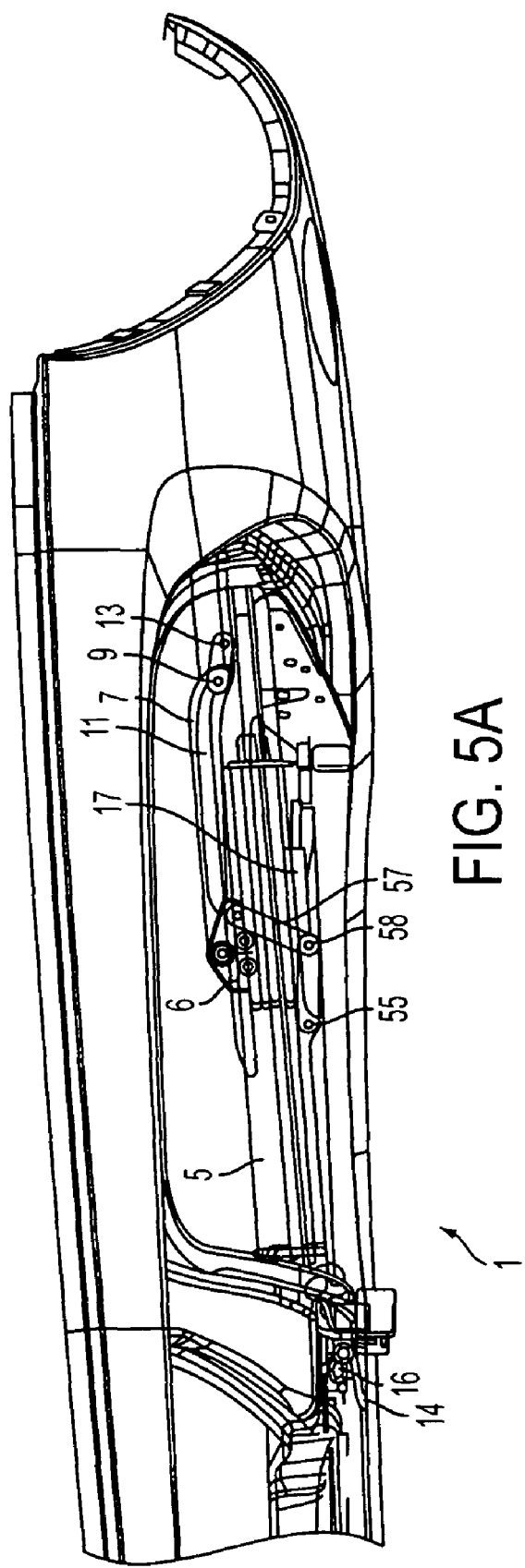

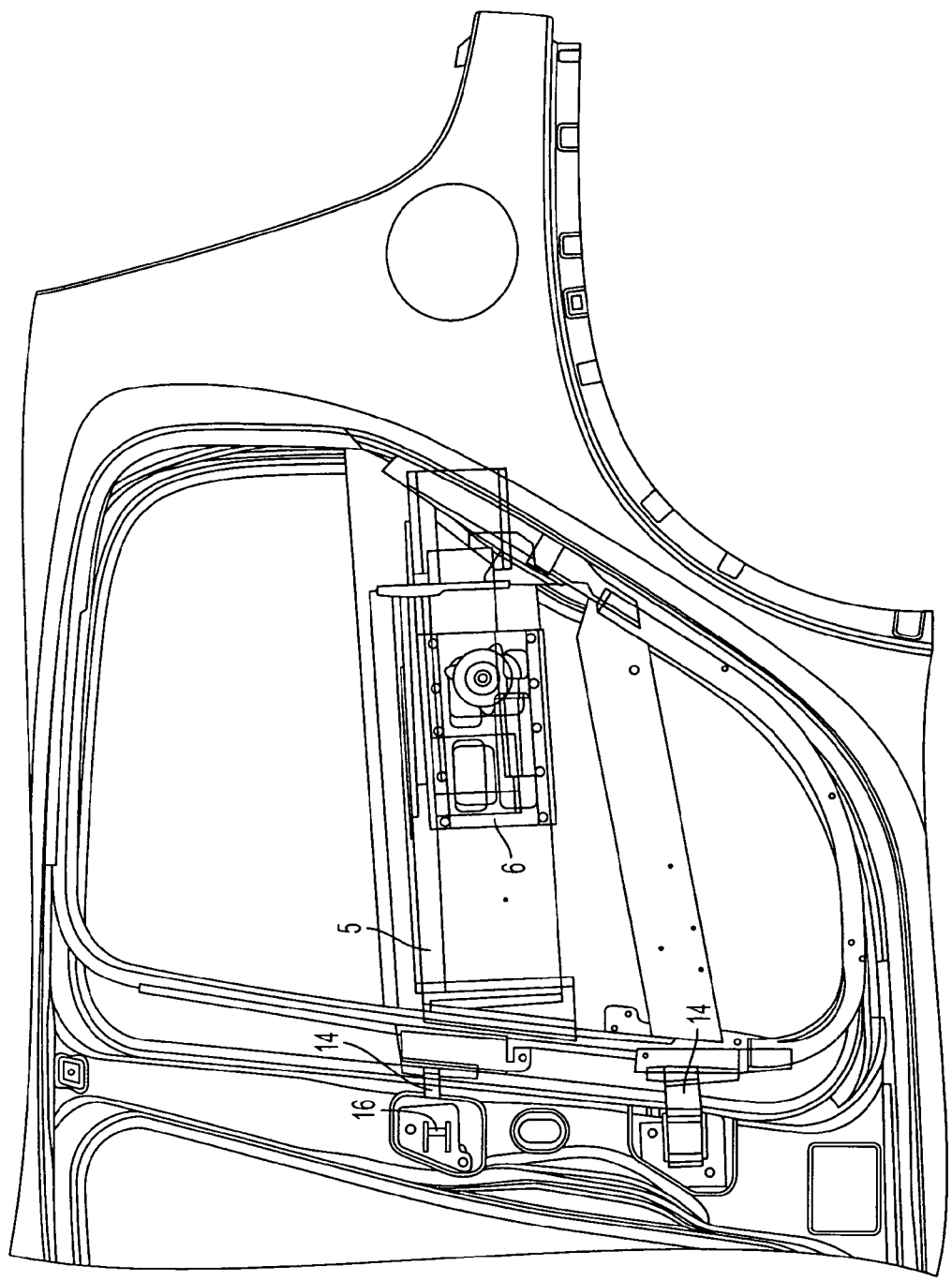

(12) United States Patent

SLIDING DOOR FOR A VEHICLE

CROSS REFERENCE TO RELATED APPLICATION

This application claims priority to German Patent Application No. 10 2007 029 816.3, filed Jun. 28, 2007 and German Patent Application No. 10 2007 035 231.1 filed Jul. 27, 2007, which are hereby incorporated by reference in their entirety for all purposes.

BACKGROUND

The present disclosure relates to a sliding door for a vehicle, in particular for a motor vehicle.

A sliding door for motor vehicles is known from EP 1 721 768 A1 which has a guide rail at its inner side. A sliding carriage is longitudinally displaceably supported on the guide rail. The sliding door furthermore includes a hinge bow which is rotatably supported at the sliding carriage and at a body flange or at another body part.

SUMMARY

It is the object of the present disclosure to improve the previously known sliding door.

This object is solved in accordance with the present disclosure by a sliding door for a vehicle comprising a guide rail; a sliding carriage, which is longitudinally displaceably supported at the guide rail; and a hinge bow, which is rotatably supported at the sliding carriage and at a body flange. The sliding door further includes an intermediate lever which is rotatably supported at the sliding carriage, a control lever which is rotatably supported at the intermediate lever and at a or the body flange or at another body part and a drive rod which is rotatably supported at the control lever. The drive rod can be directly or indirectly connected to the control lever. The drive rod can drive the control lever or a part connected thereto. It is, however, also possible for the drive rod to drive another component of the multijoint which consists of the hinge bow, the control lever, the body flange or another body part and the intermediate lever. It is furthermore possible for the drive rod to be connected directly or indirectly to the control lever and for the hinge bow or another part of the mentioned multijoint to be driven.

In accordance with a further advantageous development, the sliding door can, for example, be supported rotatably and longitudinally displaceably at the end remote from the hinge bow. For this purpose, a hinge bolt for a hinge link on the sliding door can be provided on the vehicle. The hinge bolt can, for example, be located in the region of the door opening remote from the hinge bow. The hinge link, which may be U shaped, can, for example, be provided at the end of the sliding door remote from the hinge bow in the closed position of the sliding door. The sliding door is supported rotatably and longitudinally displaceably by the cooperation of the hinge bolt and of the hinge link. The arrangement can, however, also be made conversely, that is in the manner such that the hinge bolt is provided at the sliding door and the hinge link is provided at the vehicle.

In accordance with another advantageous further development, the drive rod is rotatably supported at the guide rail. The drive rod can, however, also be rotatably supported at another part of the sliding door.

It is advantageous for the control lever to have a lever arm at which the drive rod is rotatably supported.

Another advantageous further development is characterized in that a guide pin is provided at the intermediate lever which is guided in a guide track provided at the sliding door.

DETAILED DESCRIPTION OF THE FIGURES

An embodiment of the present disclosure will be explained in detail in the following with reference to the enclosed drawing. There are shown in the drawing FIG. 1a shows an embodiment of a sliding door for a motor vehicle in the closed position in a schematic view from above;

FIGS. 2a-2i show the opening movement of the sliding door in accordance with FIG. 1 from the closed position into the completely open position in a schematic view from above in an enlarged scale;

FIGS. 3a-3i show parts of the representations of FIGS. 2a-i in an even further enlarged scale;

Figure 3A:
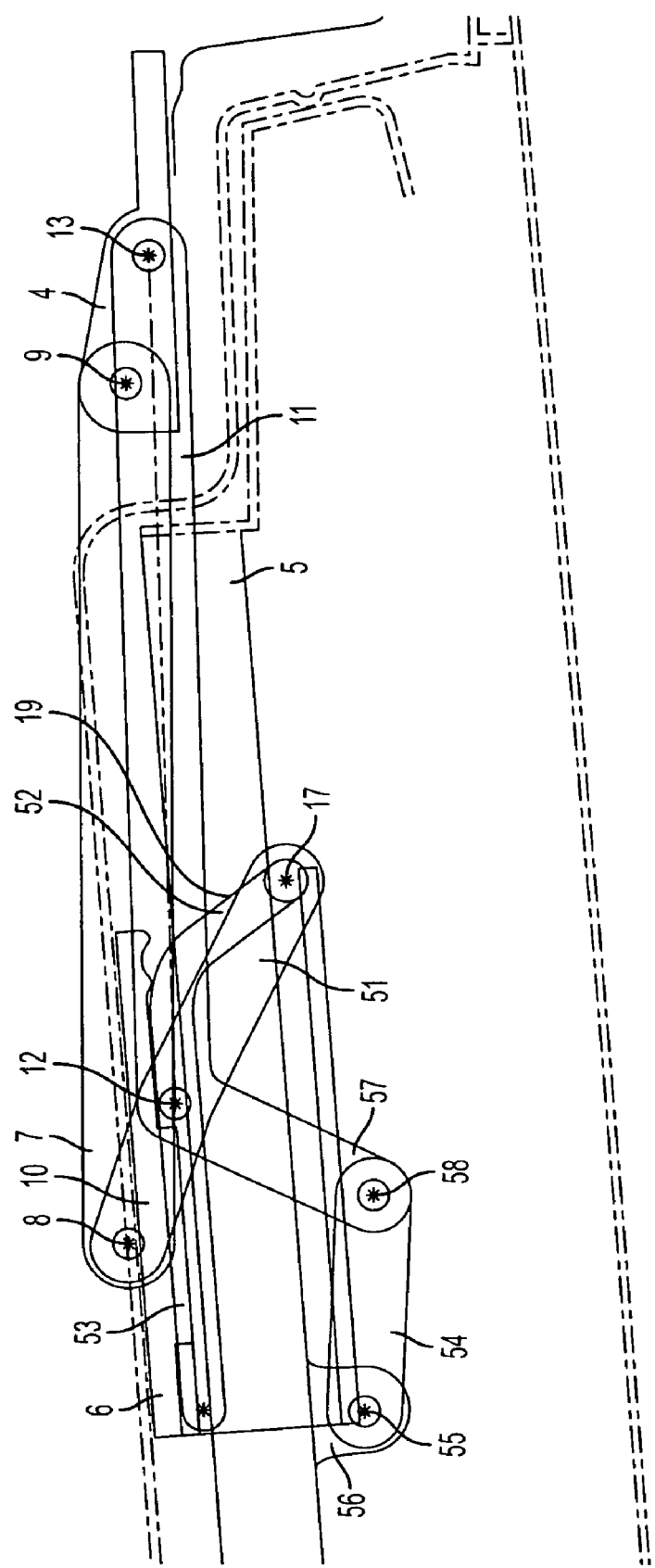
Figure 3B:
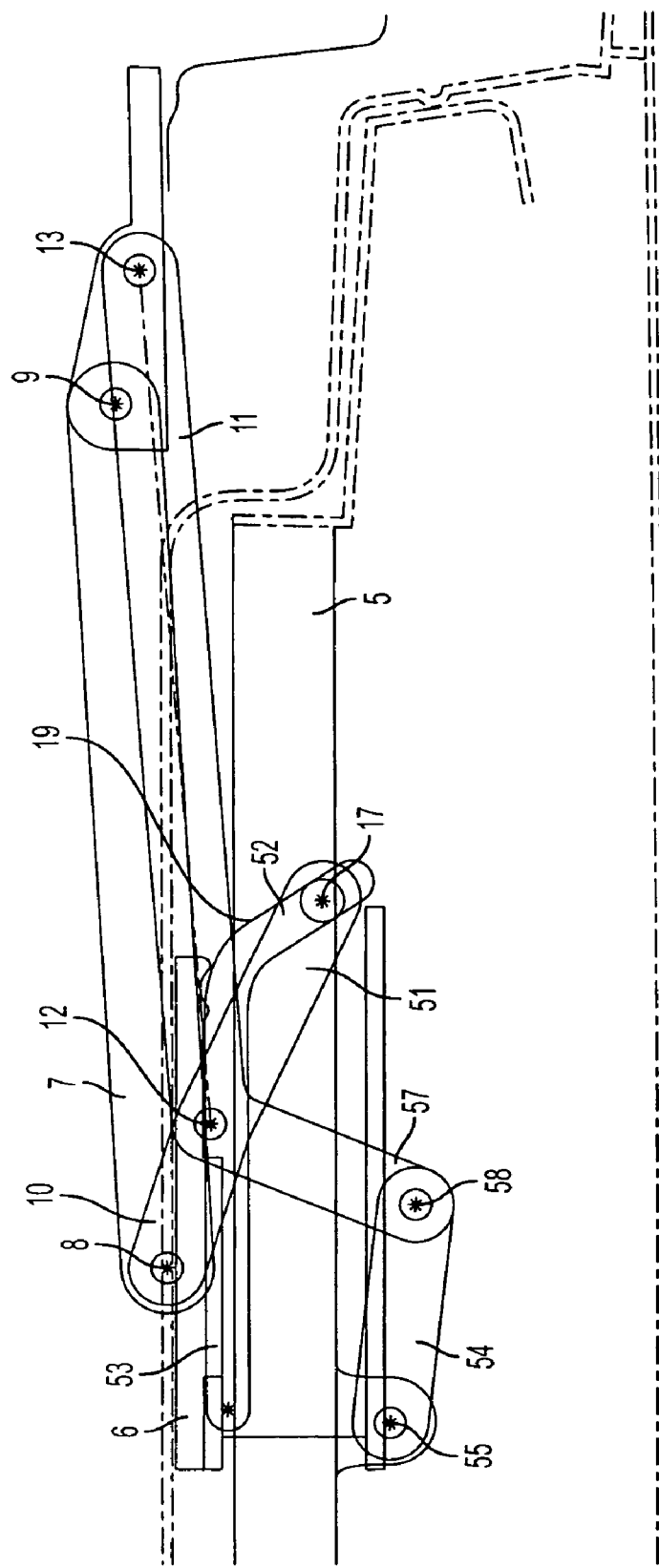
Figure 3C:
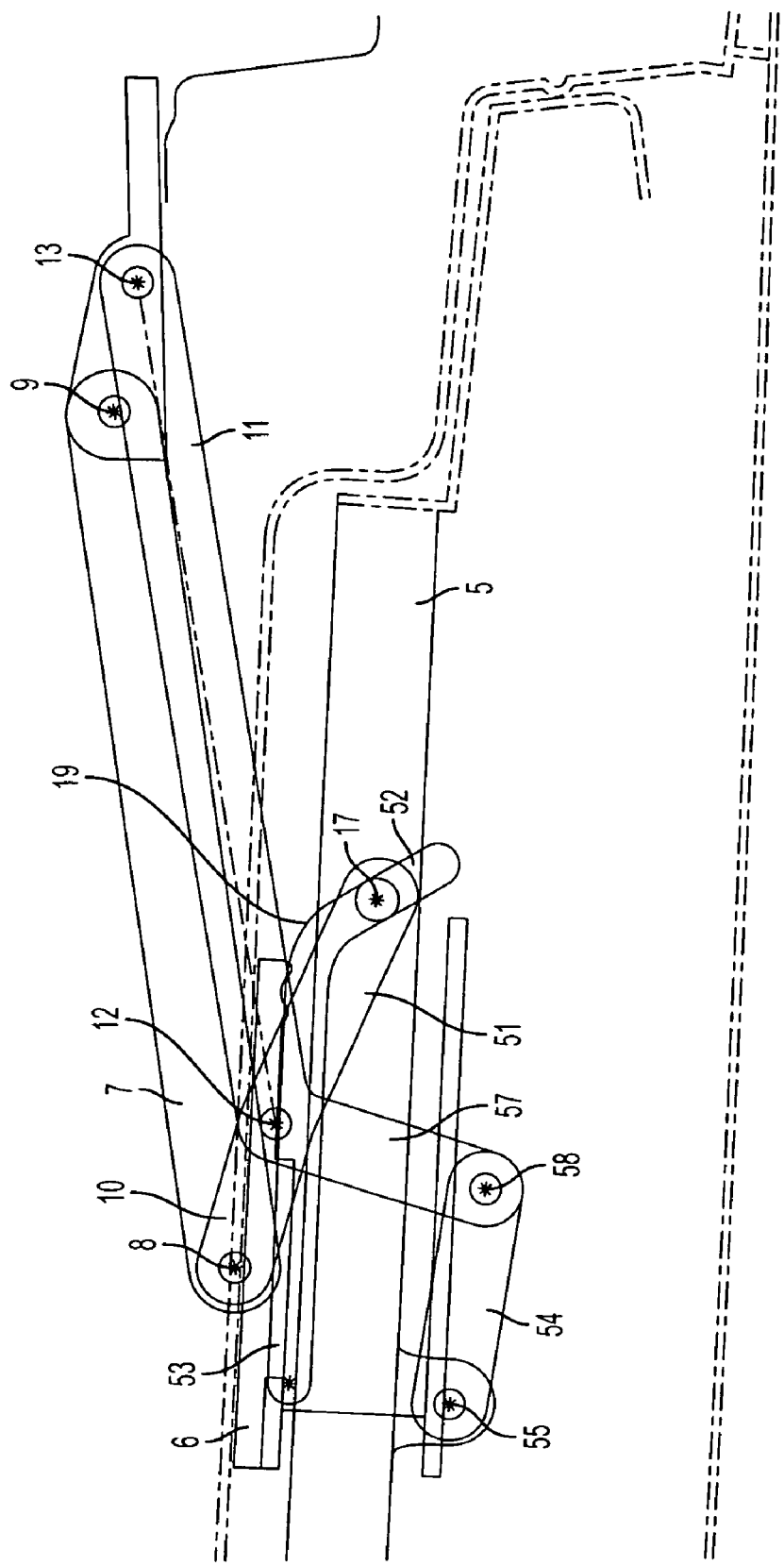
Figure 3D:
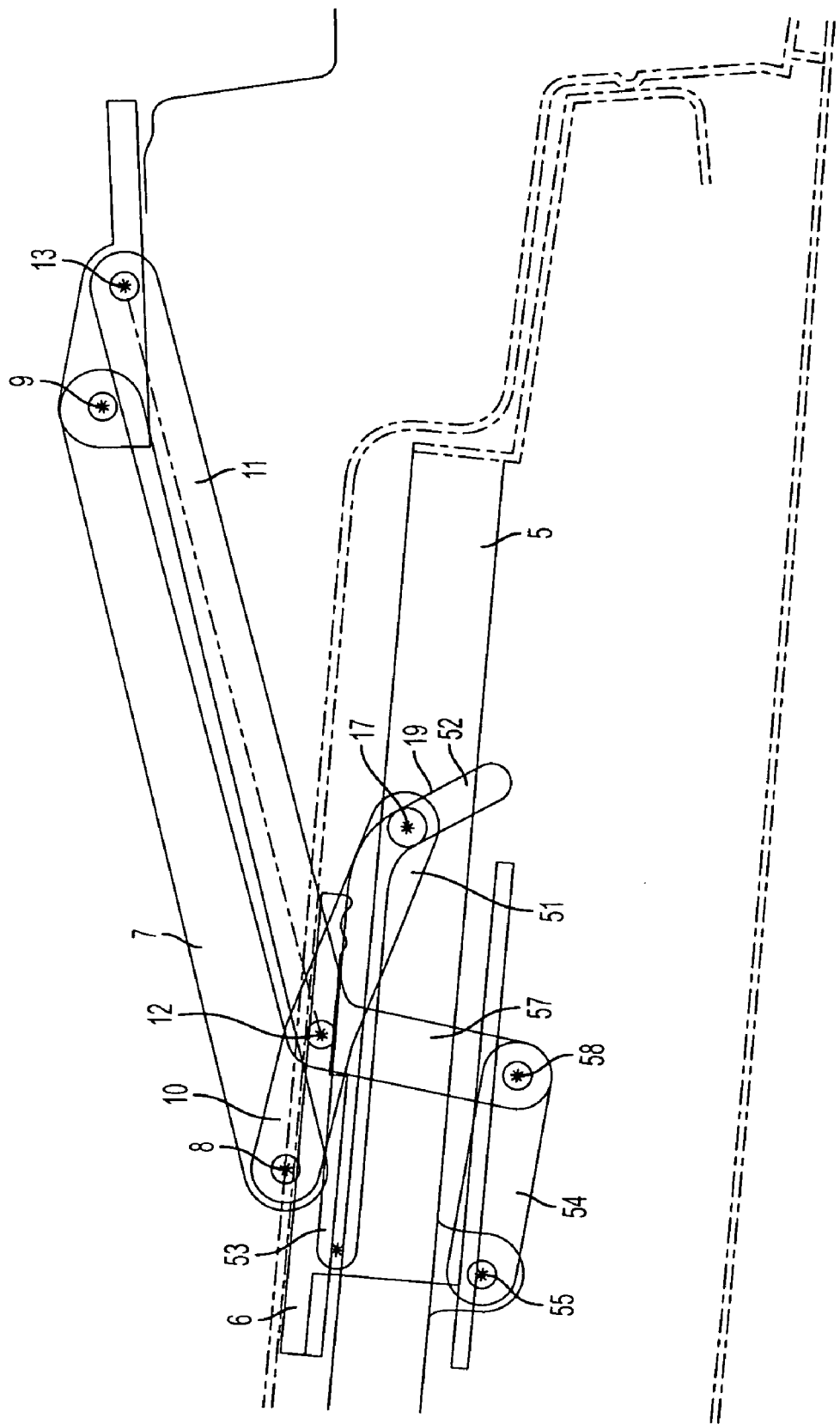
Figure 3E:
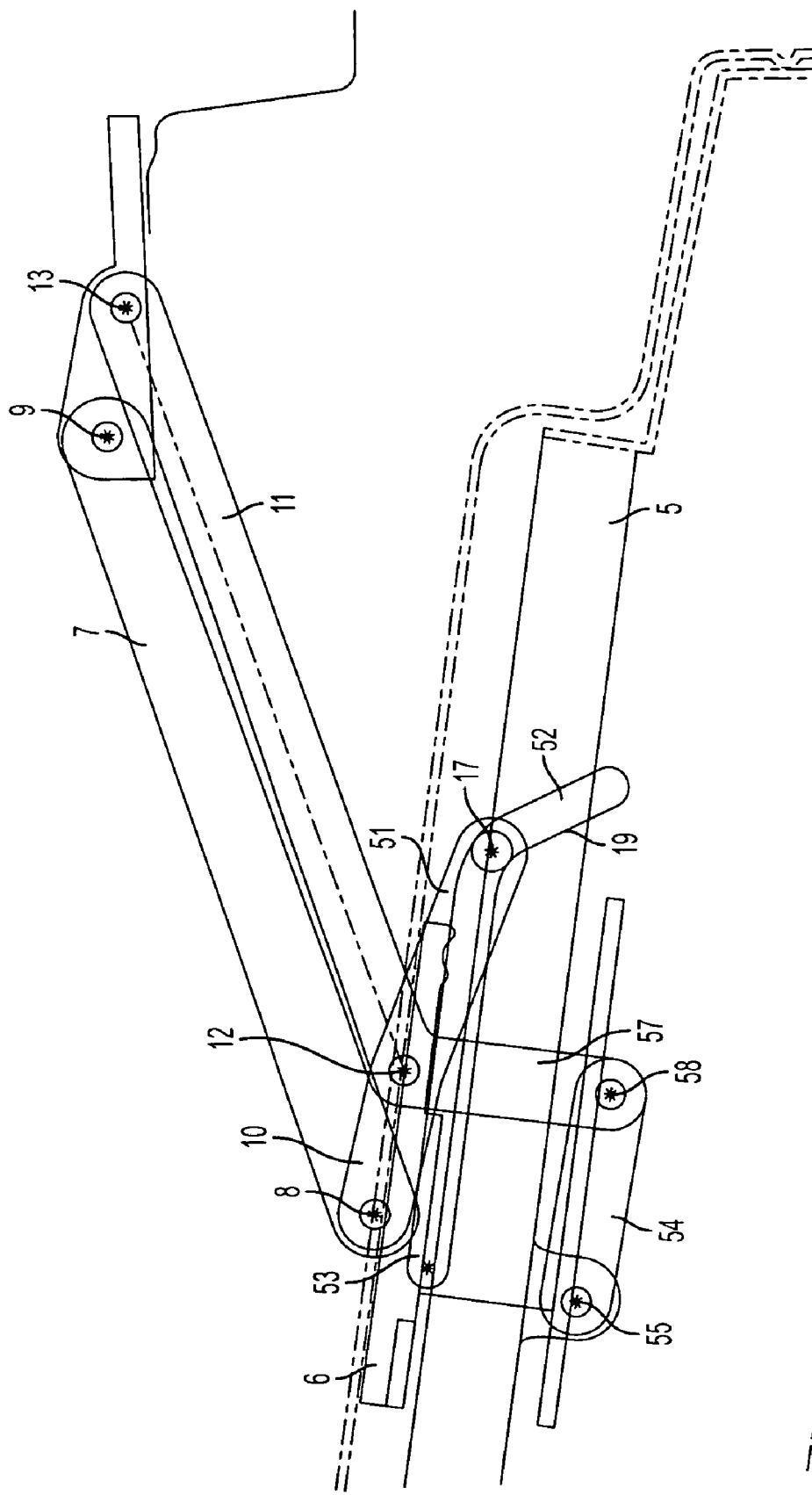
Figure 3F:
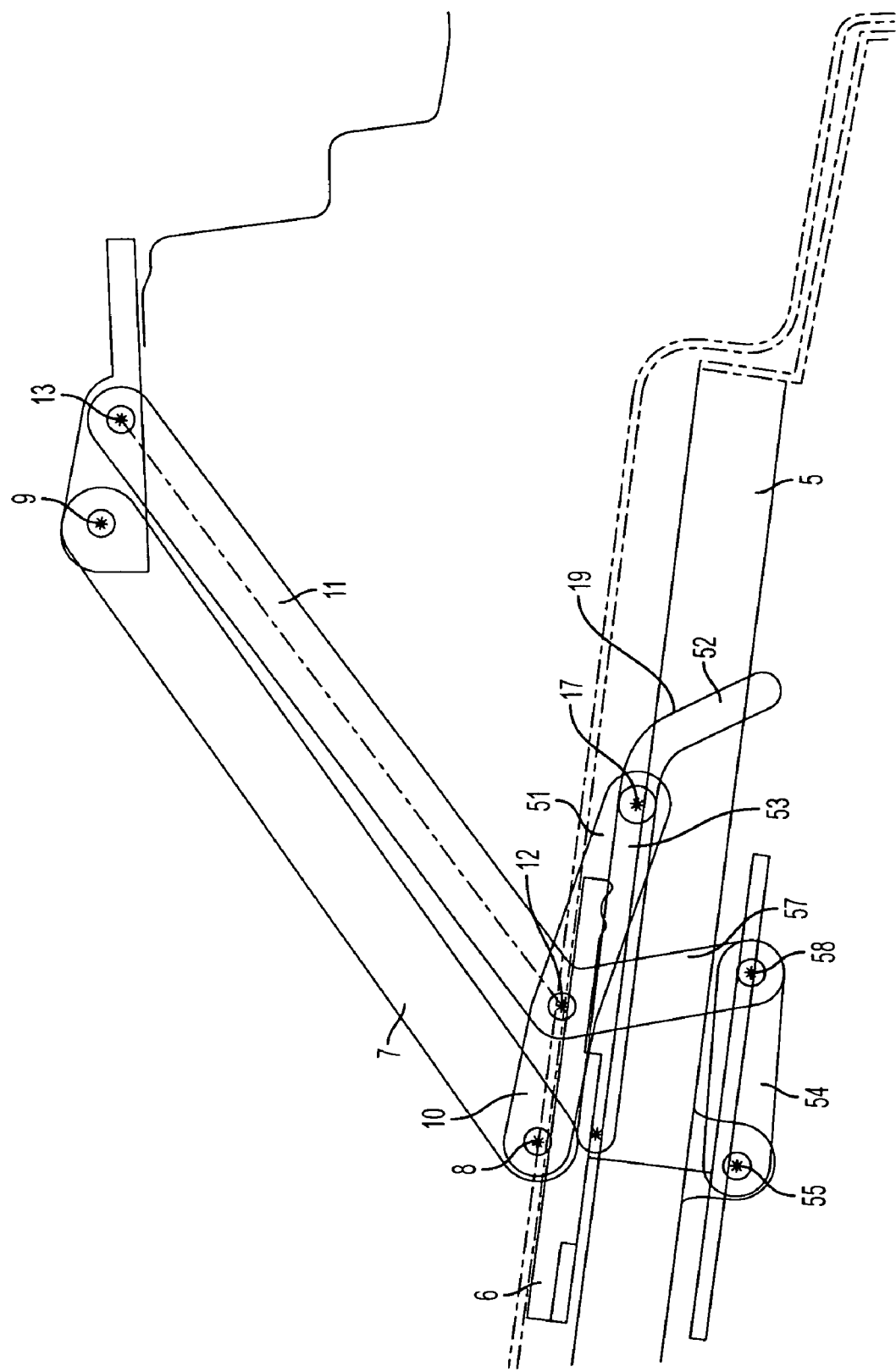
Figure 3G:
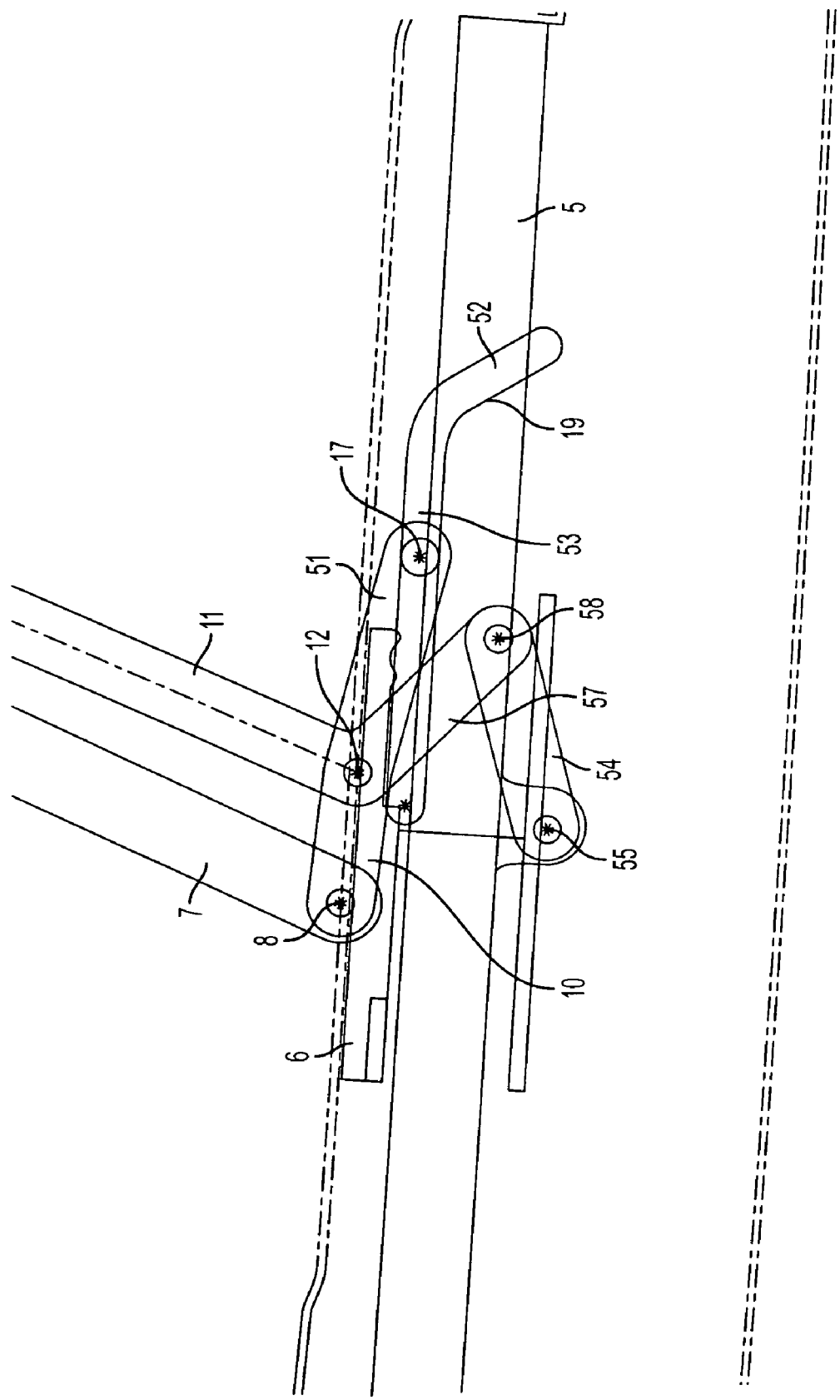
Figure 3H:
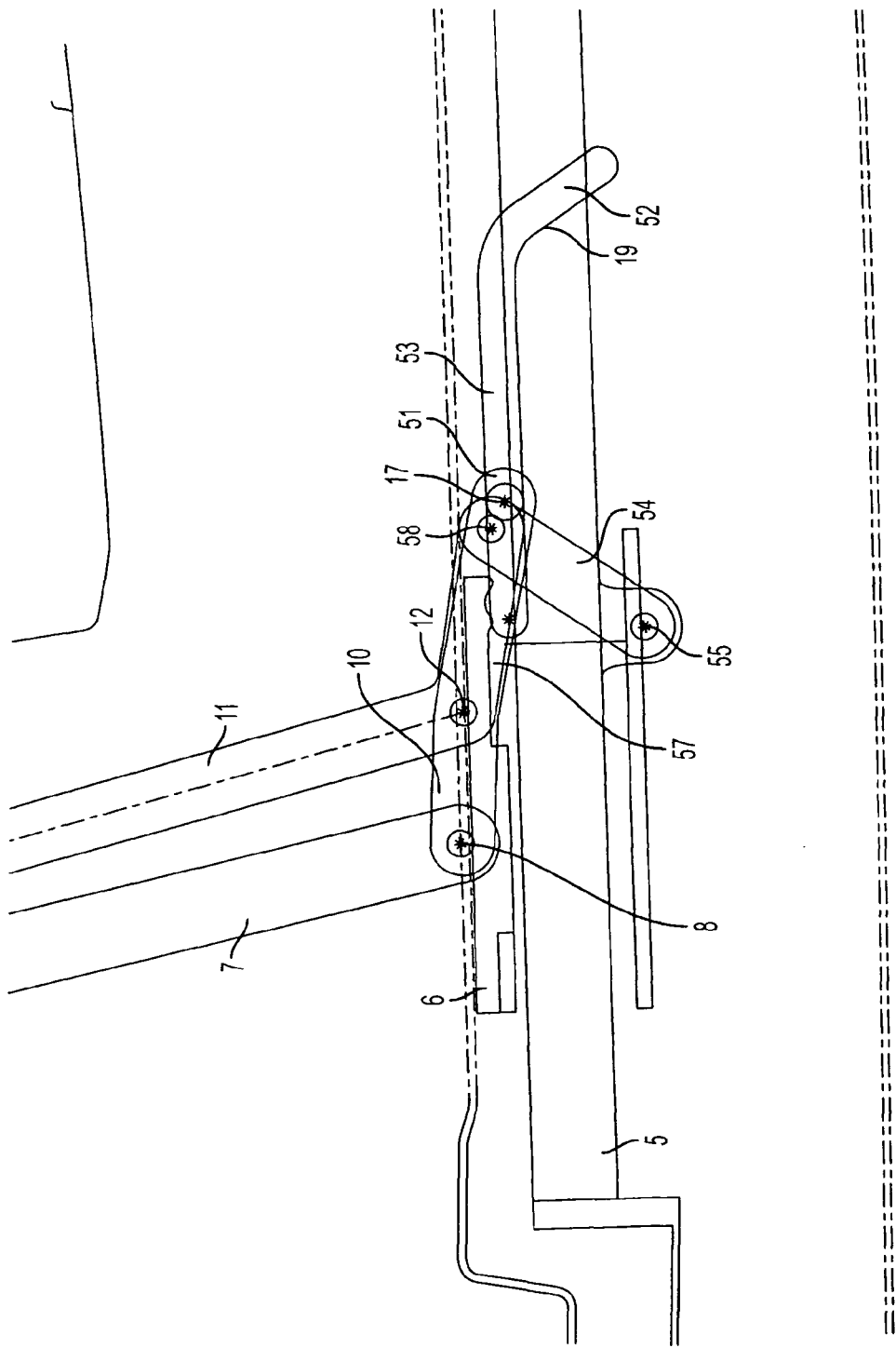
Figure 4A:
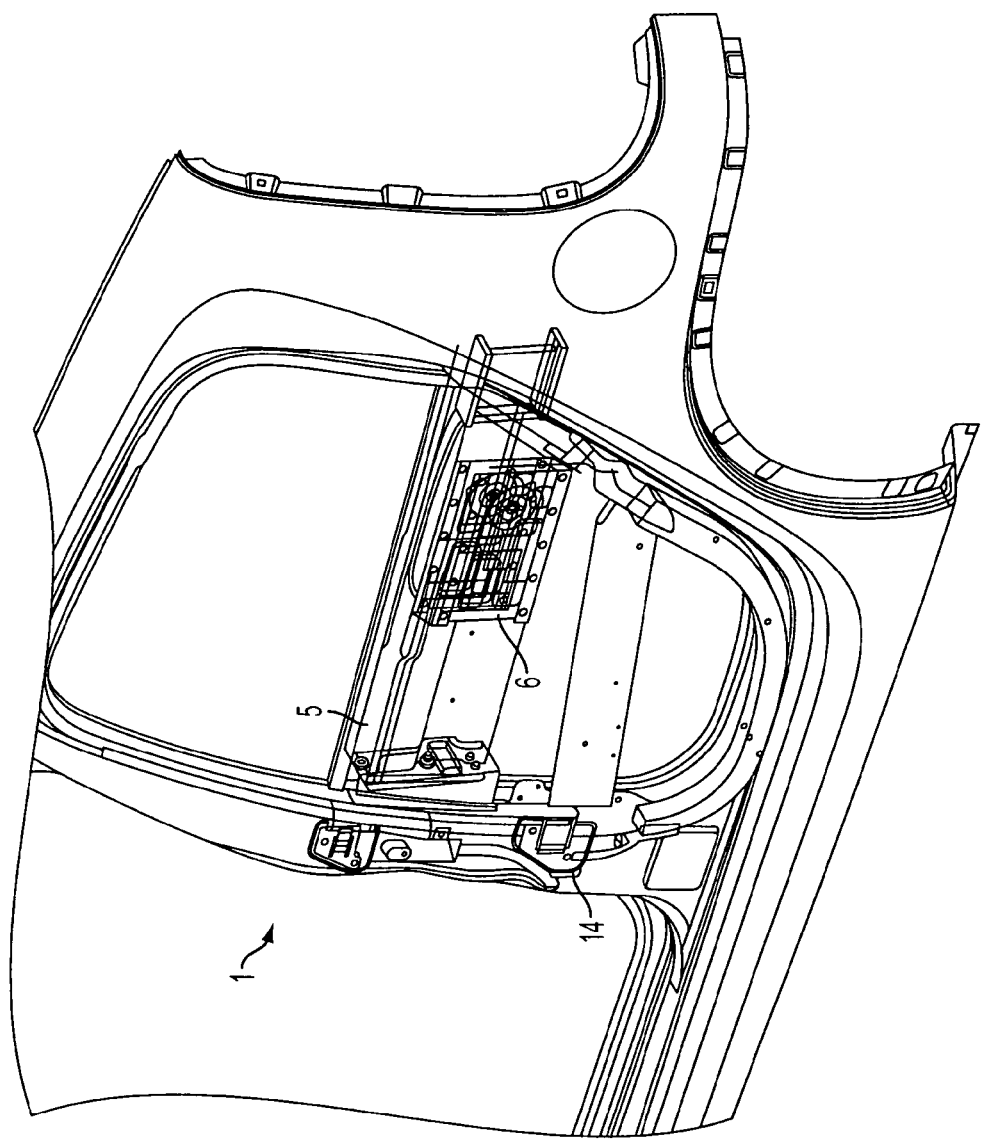
Figure 4B:
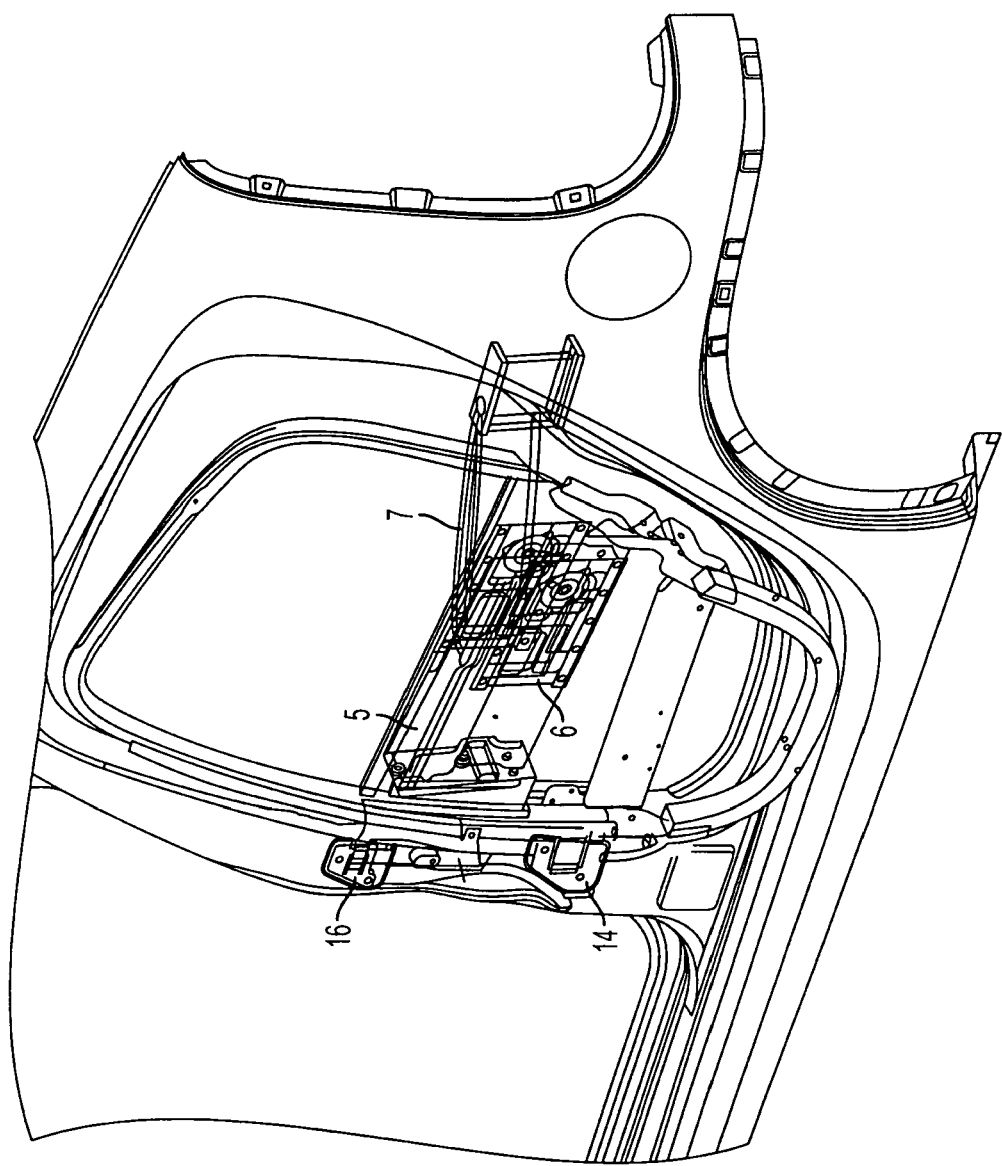
Figure 4C:
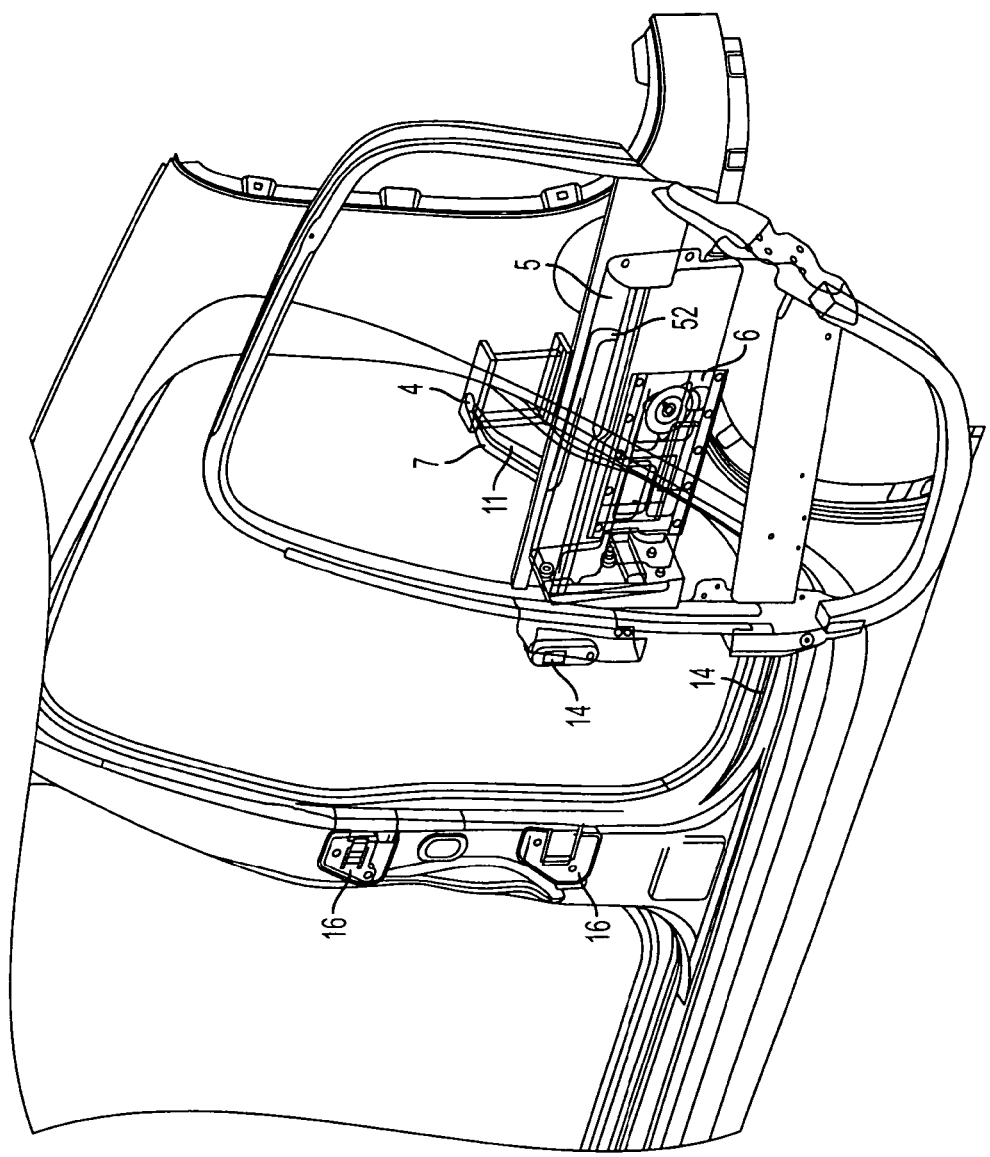
Figure 5B:
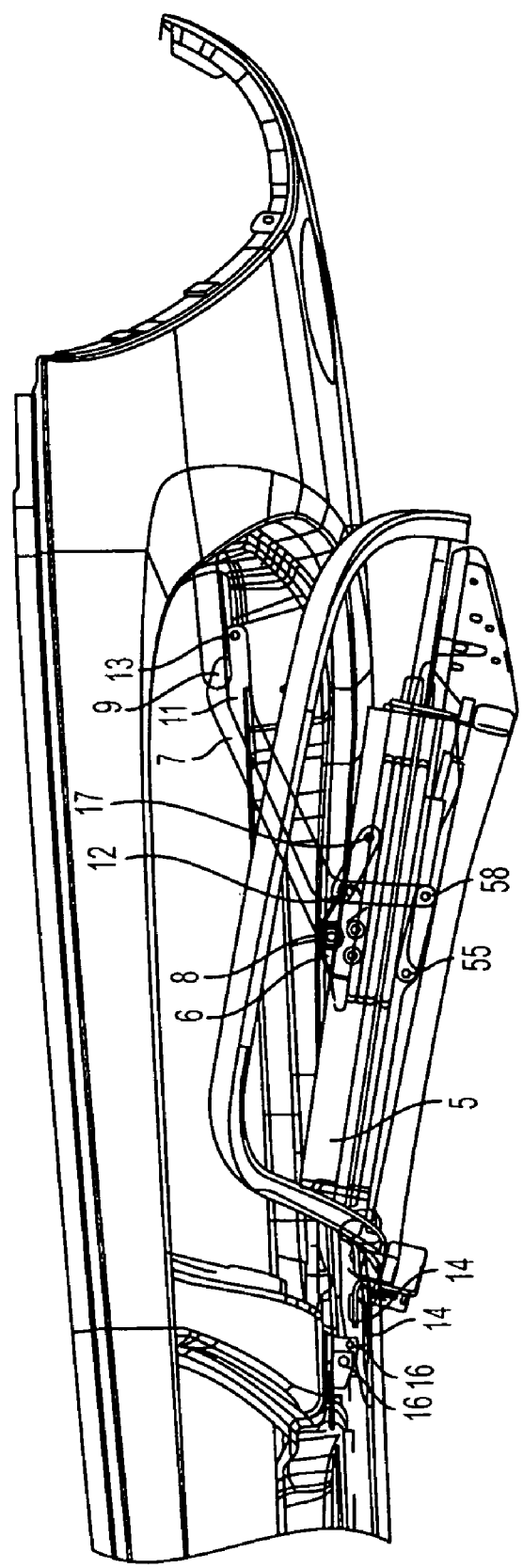
Figure 5C:
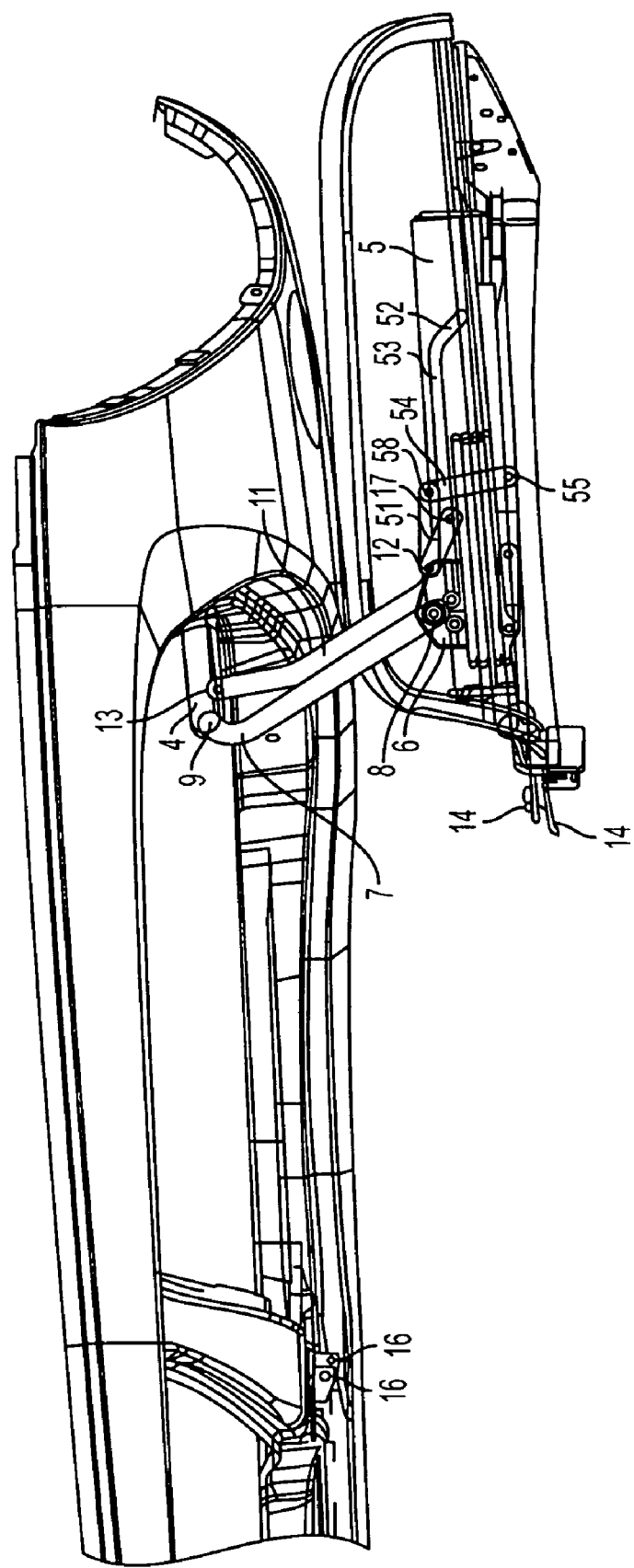
Figure 6A:
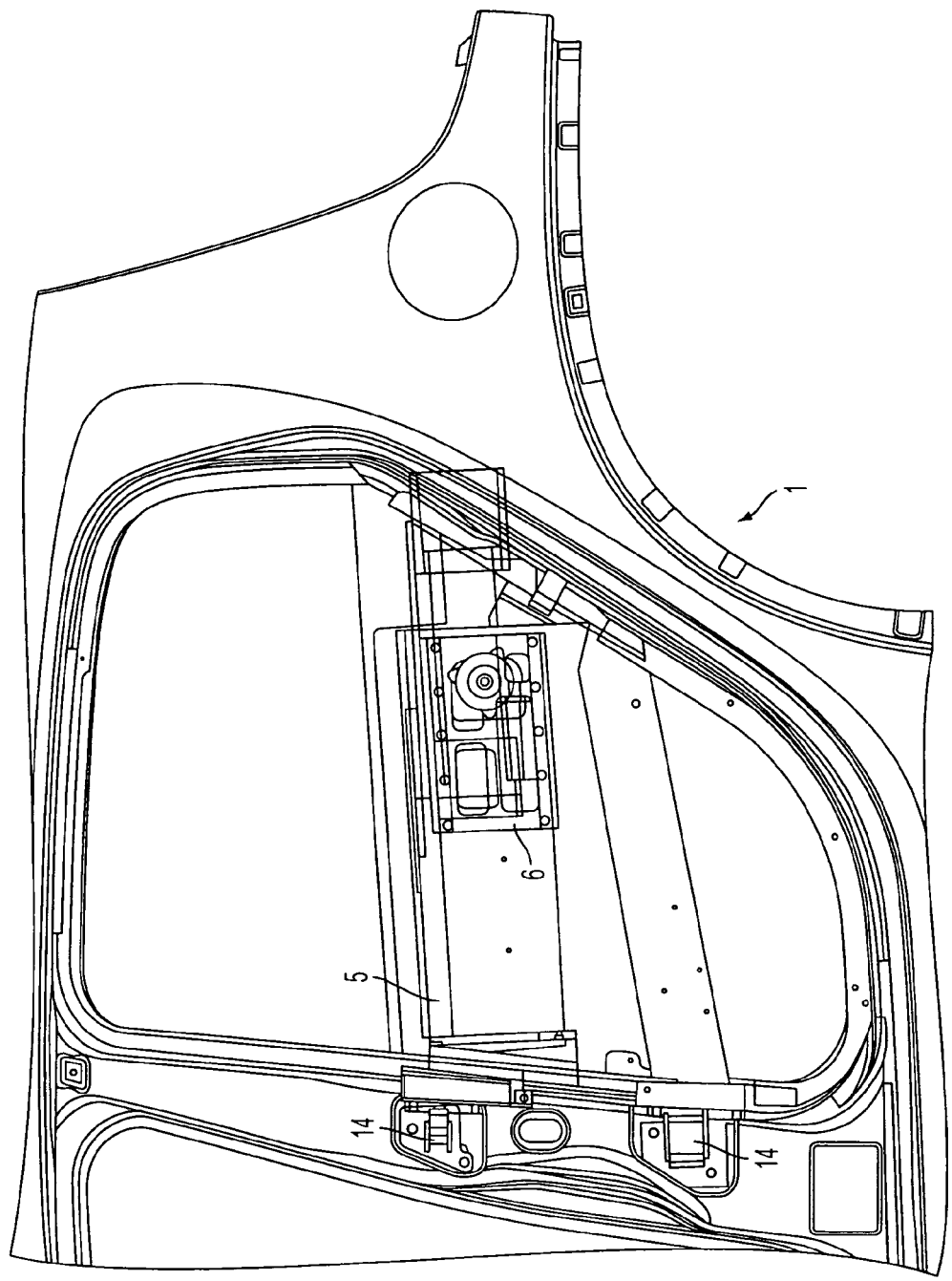
Figure 6C:
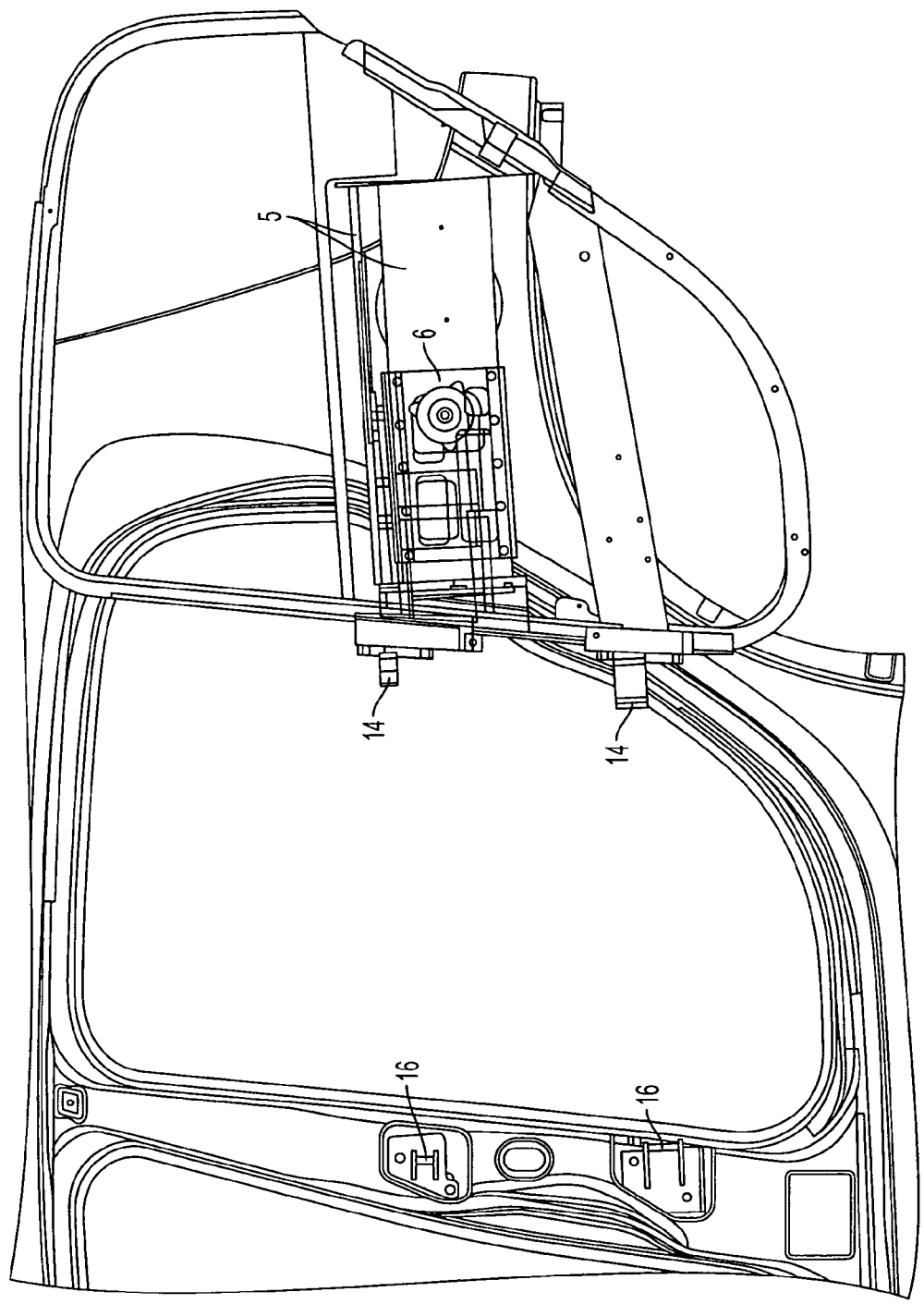

FIGS. 4a-c show the sliding door in accordance with FIGS. 1-3 in the closed position, in an intermediate position and in the completely open position, in each case in a perspective view;

FIGS. 5a-c show the sliding door in accordance with FIGS. 4a-c in a view from above; and FIGS. 6a-c show the sliding door in accordance with FIGS. 4a-c and 5a-c, in each case in a side view.

The sliding door 1 is in the completely closed position in FIGS. 1a, 2a, 3a, 4a, 5a and 6a. The sliding door 1 is the rear left hand door of a motor vehicle. It is located in the opening of the body between the B pillar 2 and a rear body part 3 in whose region a body flange 4 is connected to the body.

The sliding door 1 has a guide rail 5 at its inner side. A sliding carriage 6 is longitudinally displaceably supported at the guide rail 5.

The sliding door 1 furthermore has a hinge bow 7 which is rotatably supported around a joint 8 at the sliding carriage 6 and which is rotatably supported around a hinge 9 at the body flange 4. An intermediate lever 10 is rotatably supported at the sliding carriage 6, and around the axis of the joint 8 around which the sliding carriage 6 is also rotatably supported at the hinge bow 7. The sliding door 1 furthermore has a control lever 11 which is rotatably supported around a joint 12 at the intermediate lever 10 and which is rotatably supported around a hinge 13 at the body flange 4. The hinge bow 7, the control lever 11, the intermediate lever 10 and the body flange 4 form a multijoint with the joints 8, 9, 12 and 13.

A U-shaped hinge link 14 which extends substantially parallel to the longitudinal direction of the vehicle is provided at the sliding door 1 at the end of the sliding door 1 disposed opposite the hinge bow 7. It is open at its end remote from the hinge bow 7, that is, at its front end in the embodiment. A hinge bolt 16 which engages into the U-shaped hinge link 14 is provided at a body flange 15 which is fastened to the B pillar 2. The sliding door 1 is rotatably and longitudinally displaceably supported by the U-shaped hinge link 14 and the hinge bolt 16 in its closed position at its end remote from the hinge bow 7.

The intermediate lever 10 has an extension 51 which extends rearwardly from the joint 12. The extension 51 extends the intermediate lever 10 beyond the joint 12 along the connection line from the joint 8 to the joint 12.

A guide pin 17 is provided at the intermediate lever 10 in the region of the rear end of the extension 51. In the closed position of the sliding door 1, the hinge 12 is spaced outwardly and rearwardly of the hinge 8, with the connection line from the joint 8 to the joint 12 extending at an angle to the longitudinal axis of the vehicle. The angle amounts to approximately 60°; other angles are possible. The joint 13 is likewise spaced in a direction outwardly and rearwardly from the joint 9, with the connection line from the joint 9 to the joint 13 likewise extending at an angle to the longitudinal axis of the vehicle. The angle amounts to approximately 60°; other angles are possible. The spacing of the guide pin 17 from the joint 12 is approximately twice as large as the spacing of the joint 12 from the joint 8.

The guide pin 17 is guided in a guide track 19. The guide track 19 is provided at the sliding door 1. The guide track 19 is accordingly a guide track fixed with respect to the door. It has a first section 52 which extends from the outside in and from the rear to the front at an angle to the longitudinal axis of the vehicle and a second section which adjoins the inner front end of the first section 52 in an arc and which extends substantially from the rear to the front. The angle amounts to approximately 60°; other angles are possible. The second section 53 extends substantially parallel to the guide rail 5.

A drive rod 54 is rotatably supported around a joint 55 at the guide rail 5. The joint 55 is provided at a projection 56 which projects outwardly from the guide rail 5.

The control lever 11 has a lever arm 57 which extends outwardly from the joint 12. The control lever 11 has a joint 58 in the region of the outer end of the lever arm 57 and the rear end of the drive rod 54 is rotatably supported at said joint. The lever arm 57 forms an angle with the line from the joint 13 to the joint 12. The angle amounts to approximately 135°; other angles are possible. The length of the lever arm 57, that is the spacing of the joints 12 and 58, is approximately just as large as the length of the drive rod 54, that is, the spacing of the joints 55 and 58.

Figure 1A:
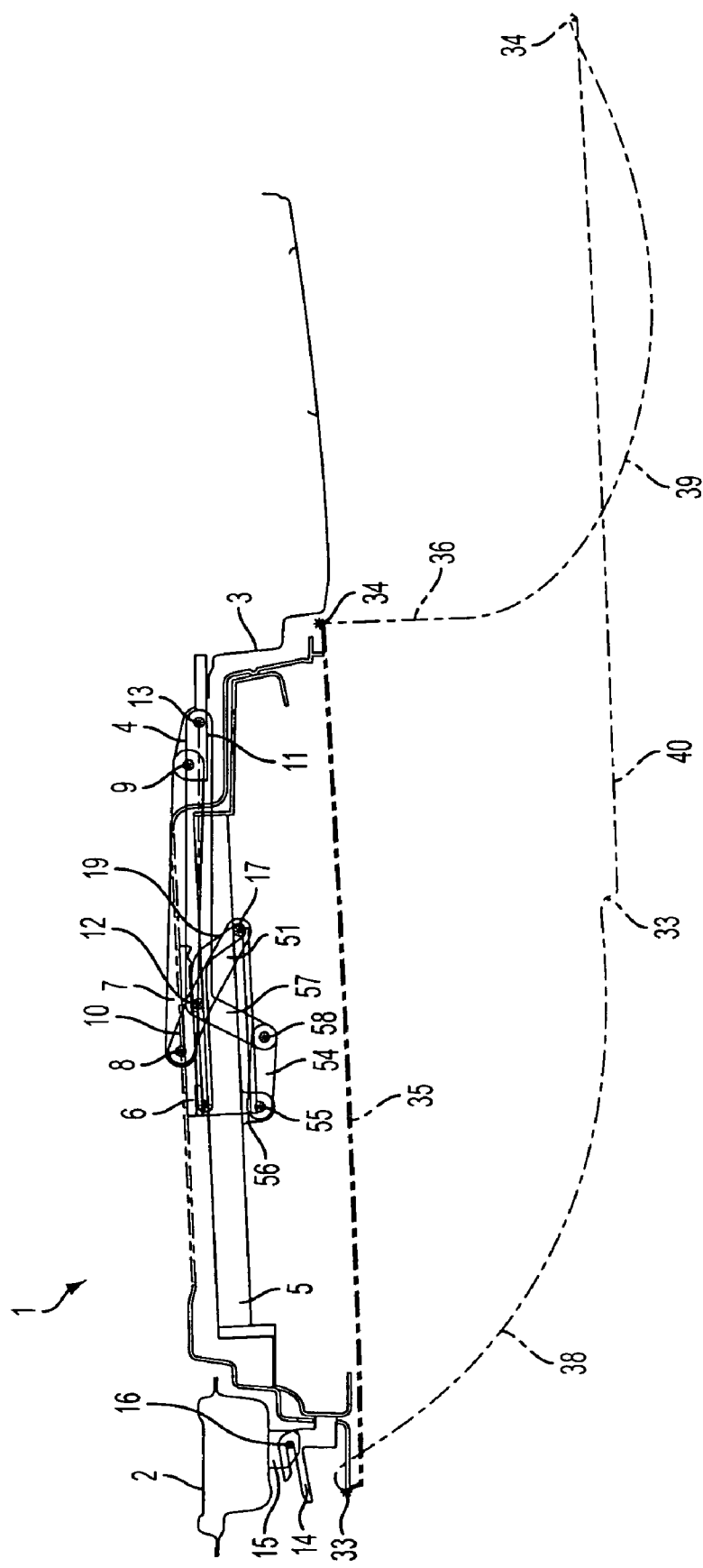
FIG. 1b shows the sliding door in accordance with FIG. 1a in the completely open position.
Figure 2A:
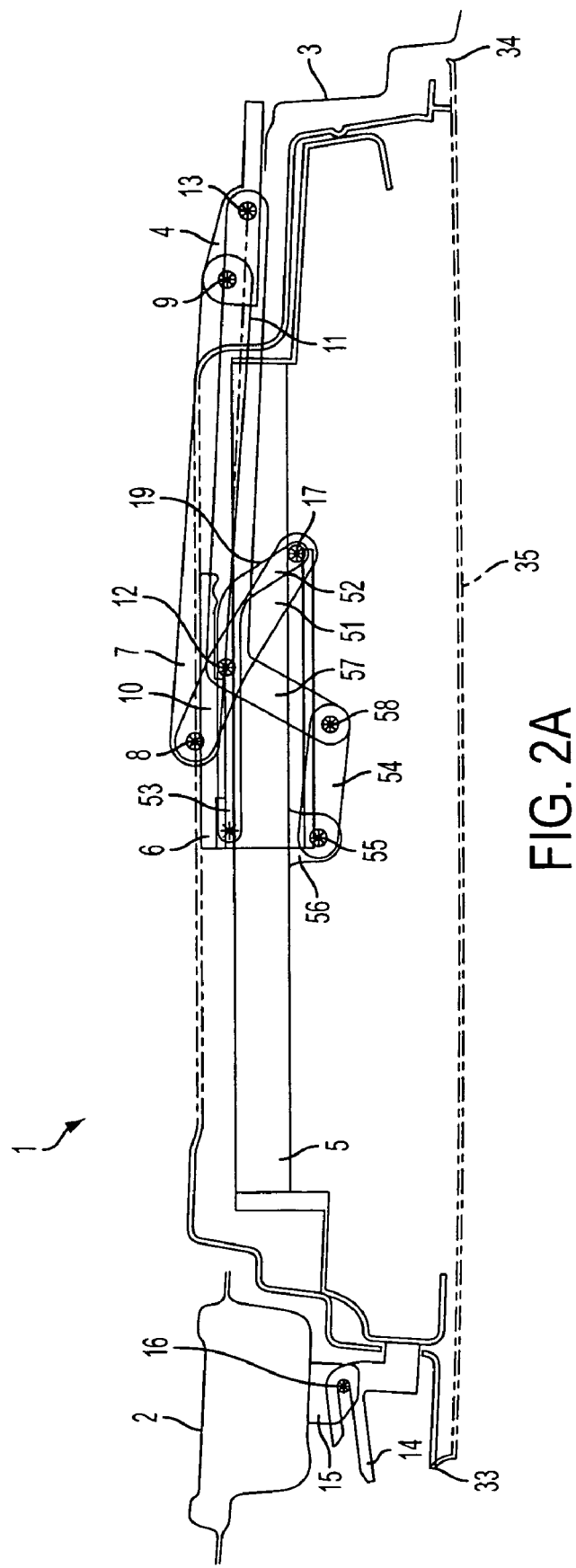
Figure 2B:
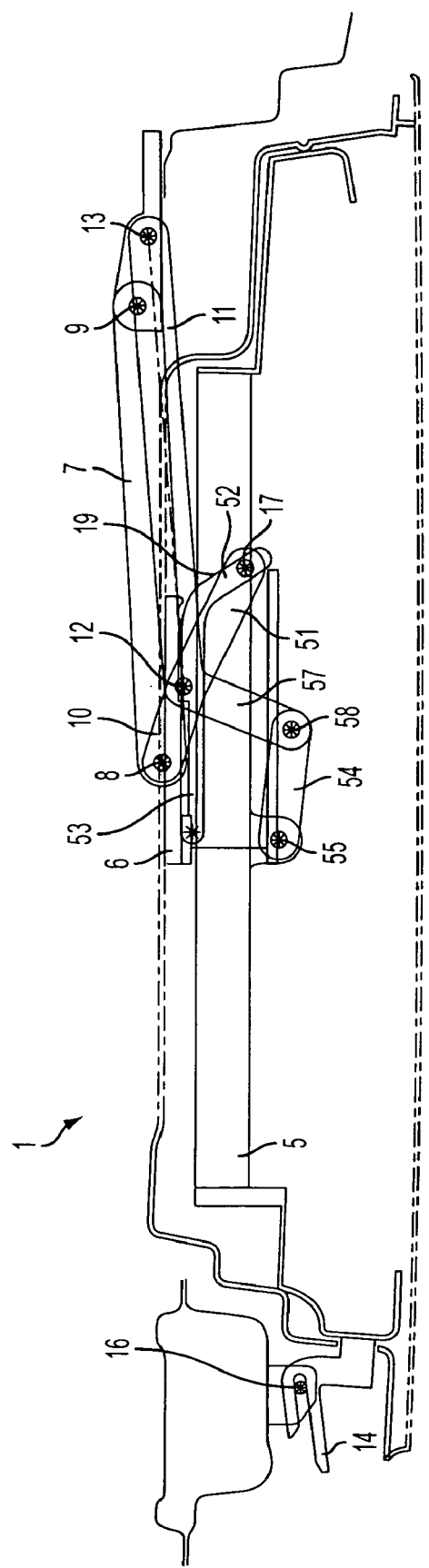
Figure 2C:
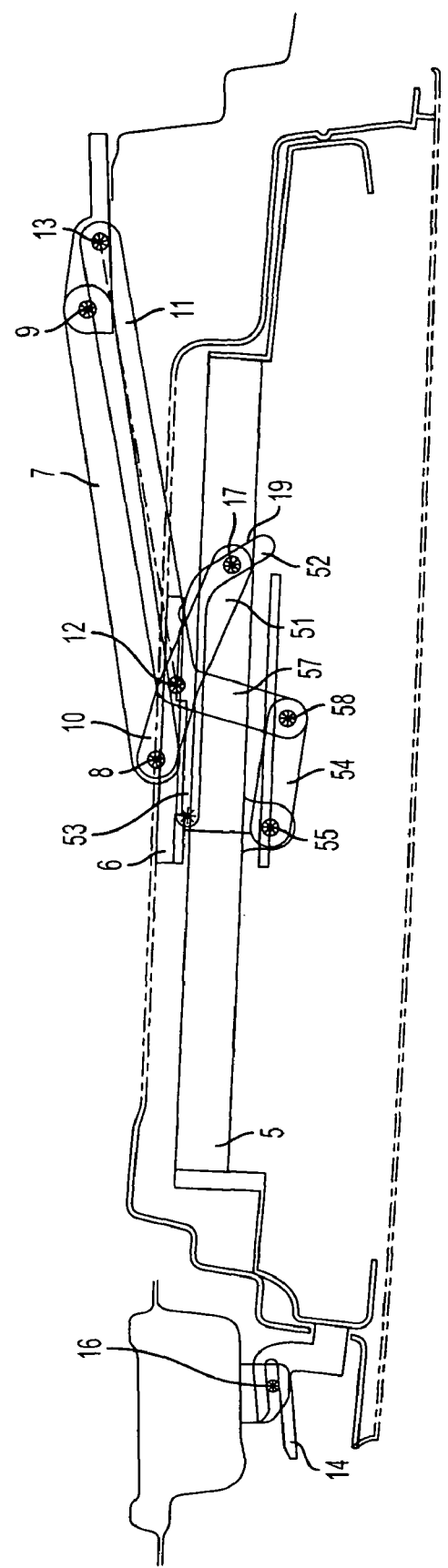
Figure 2D:
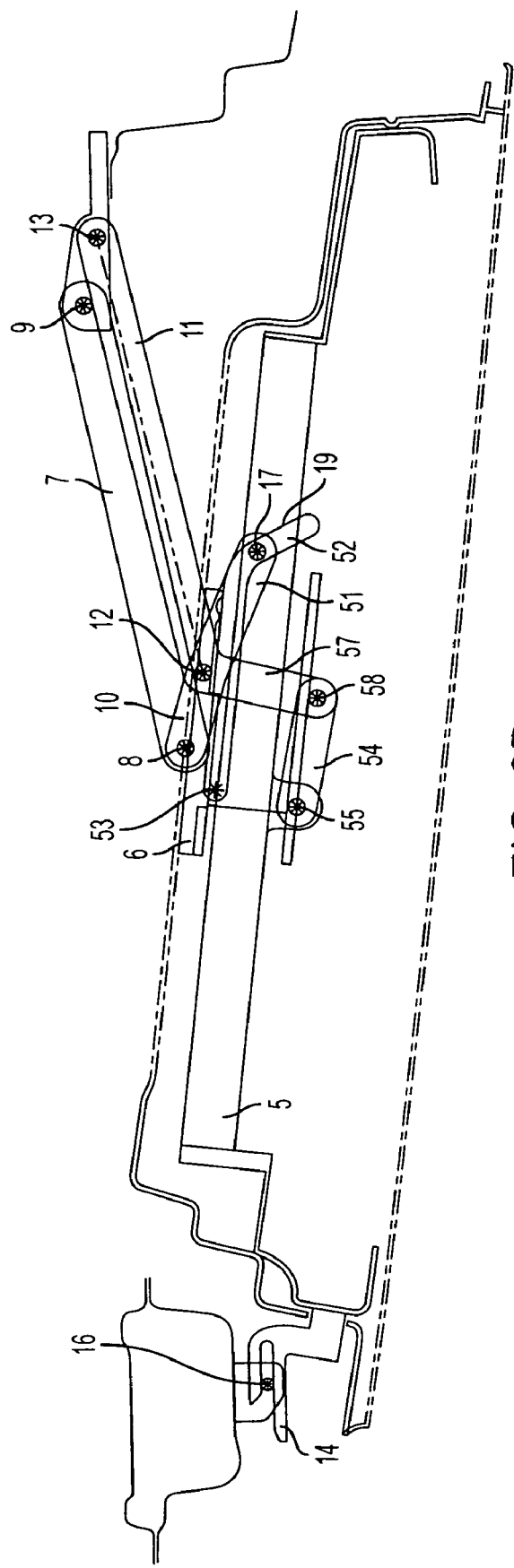

In the completely closed position of the sliding door 1, which is shown in FIGS. 1a, 2a and 3a, the hinge bolt 16 is disposed in the U-shaped hinge link 14, and indeed in the region of its end. The guide pin 17 is located in the region of the outer closed end of the first section 52 of the guide track 19. The drive rod 54 faces substantially rearwardly, starting from the joint 55. The lever arm 57 extends obliquely from the outside in and from the front to the rear, starting from the joint 58.

In the course of the opening movement, the positions of FIGS. 2b to 2i and/or the positions of FIGS. 3b to 3i are subsequently sequentially passed through. This opening movement can be produced in that the guide rail 5 is moved rearwardly relative to the sliding carriage 6. A motor, in particular an electric motor, can be present at the sliding carriage 6 for the drive of the guide rail 5 relative to the sliding carriage 6. The opening movement can, however, also be generated by hand. The guide rail 5 can in particular be moved manually to the rear relative to the sliding carriage 6. For this purpose, a handle can be provided at the sliding door 1 by which the sliding door 1 and with it the guide rail 5 can be moved relative to the sliding carriage 6.

If the guide rail 5 is moved rearwardly relative to the sliding carriage 6, the joint 55 fixed relative to the rail or the door also moves rearwardly. The drive rod 54 is hereby likewise driven rearwardly. The joint 58 located at the other end of the drive rod 54 is thereby likewise moved rearwardly, whereby the control lever 11 is rotated counter clockwise around the joint 12. The control lever 11 is thereby pivoted counter clockwise around the joint 13 at the body flange 4. The hinge bow 7 is also pivoted counter clockwise around the joint 9 by the pivoting of the control lever 11. The intermediate lever 10 is likewise guided in a compulsory manner by the pivoting of the hinge bow 7 around the joint 9 since it forms a multijoint with the hinge bow 7, the control lever 11 and the body flange 4—as stated.

The hinge link 14 is rotated around the hinge bolt 16 by the opening movement. The sliding carriage 6 is likewise guided in a compulsory manner during this movement. A pivoting of the sliding carriage 6 is prevented by the guidance of the hinge link 14 in the hinge bolt 16. The direction of the U-shaped hinge link 14 extends substantially away from the sliding carriage 6 so that a rotation of the sliding carriage 6 around the joint 8 is effectively prevented.

In the further course of the opening of the sliding door 1, the guide track 5 is moved, in a powered or manual manner, further rearwardly relative to the sliding carriage 6. The hinge bolt 16 moves away from the end of the U-shaped hinge link 14. The guide pin 17 moves inwardly in the first section 52 of the guide track 19. The lever arm 57 is pivoted further counter clockwise around the joint 12, driven by the drive rod 54. The control lever 11 and the hinge bow 7 are thereby pivoted further counter clockwise around the joints 13 and 9.

Figure 2E:
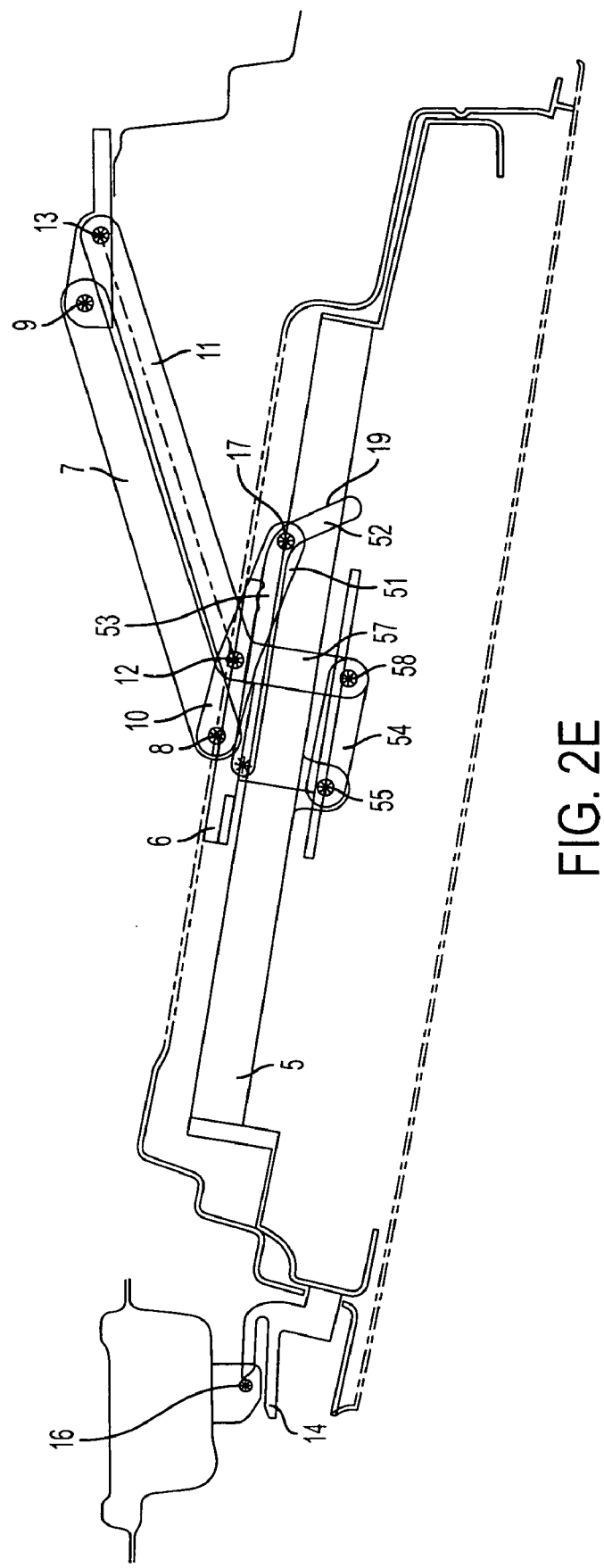
Figure 2F:
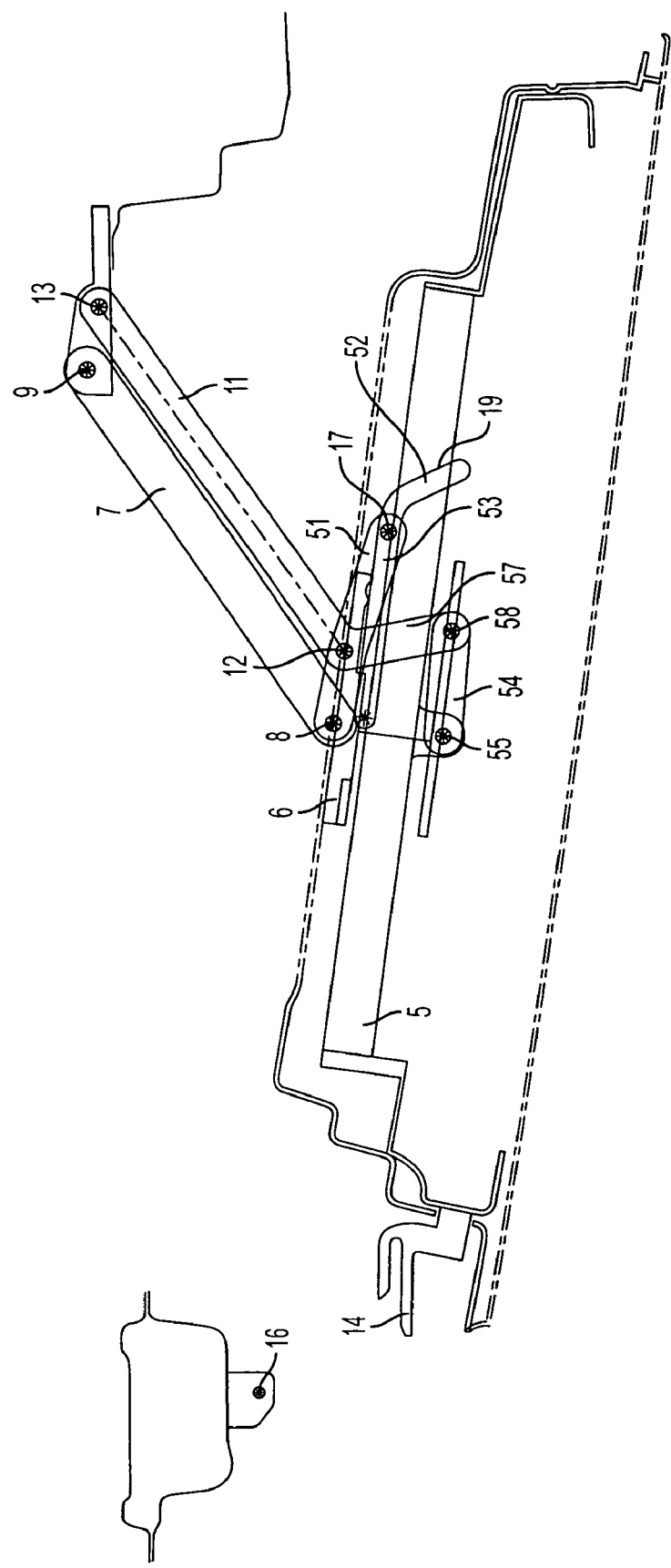
Figure 2H:
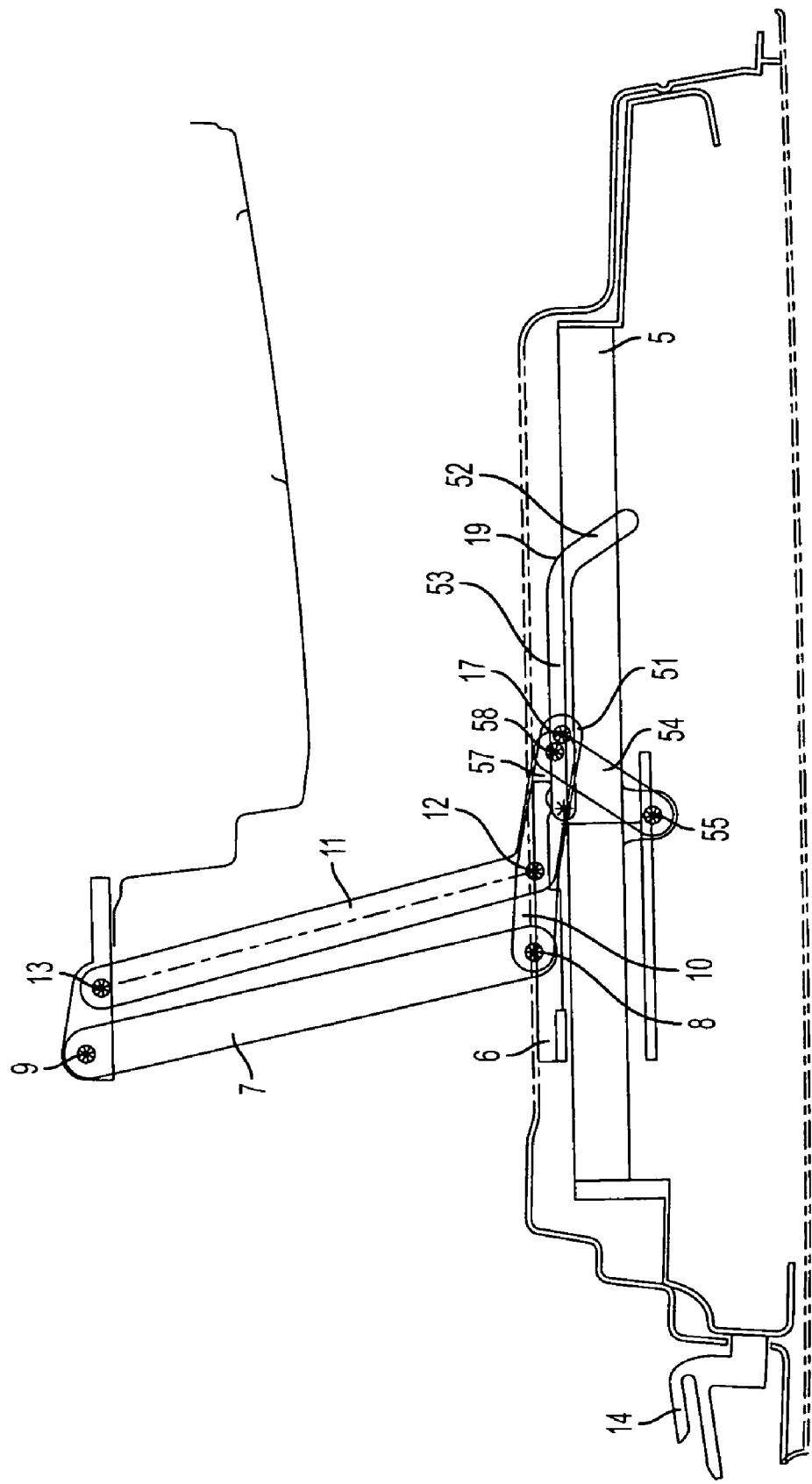
Figure 21:
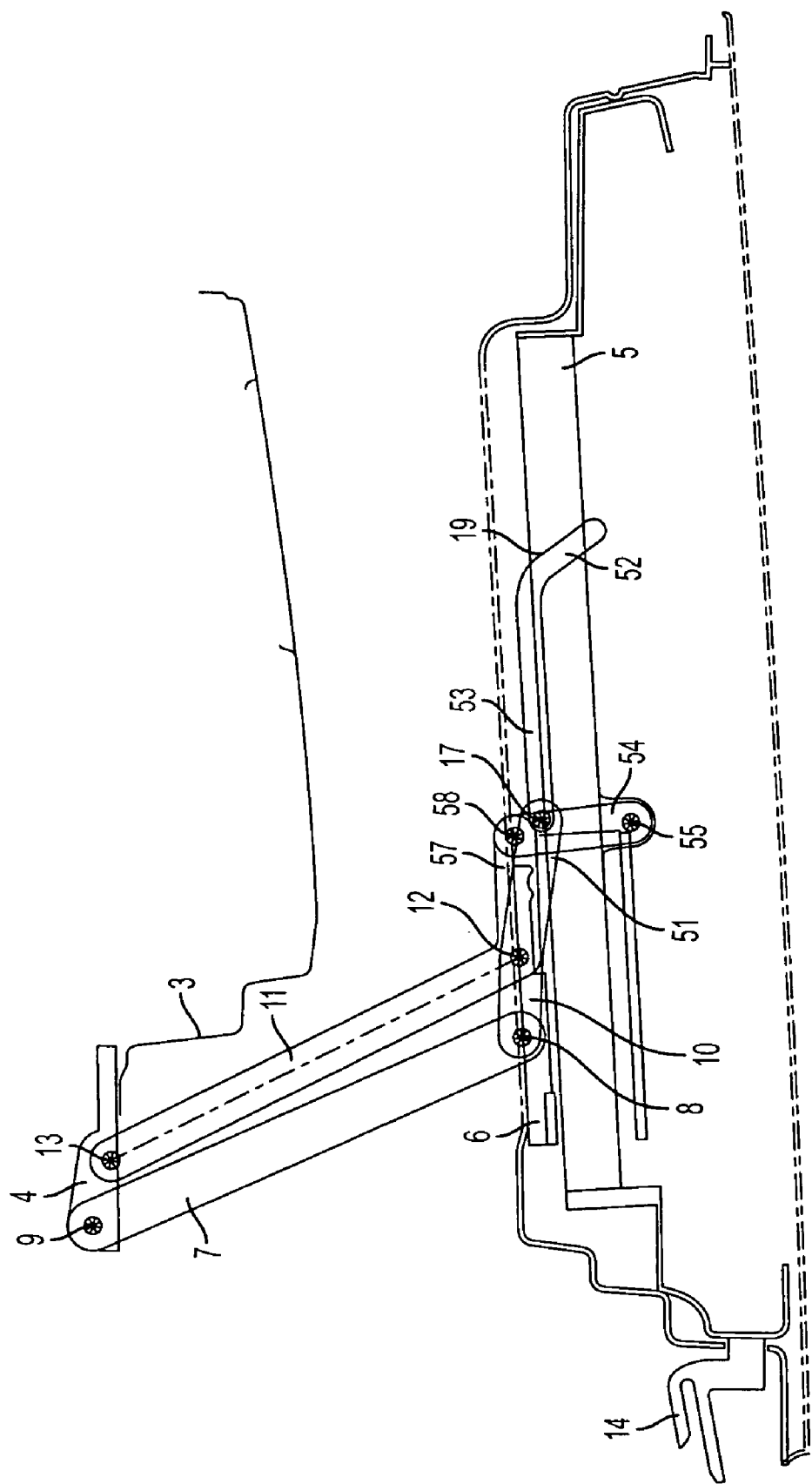

The position in accordance with FIGS. 2e and 3e are reached on the further opening of the sliding door 1. The hinge bolt 16 is located at the end of the U-shaped hinge link 14. The guide pin 17 reaches the inner end of the first section 52 of the guide track 19.

In the position in accordance with FIGS. 2e and 3e, the hinge bolt 16 is released by the U-shaped hinge link 14. Furthermore, the guide pin 17 moves from the inner end of the first section 52 of the guide track 19 to the rear end of the second section 53 of the guide track 19. The compulsory guidance by the hinge bolt 16 in the U-shaped hinge link 14 operative until then ends when the position in accordance with FIGS. 2e and 3e is reached. From the position in accordance with FIGS. 2e and 3e, on the further opening movement of the sliding door 1, the compulsory guidance becomes operative which is communicated by the second section 53 of the guide track 19. A pivoting of the sliding carriage 6 around the joint 8 is prevented by the guidance of the guide pin 17 in the second section 53 of the guide track 19. In this manner, the rotary movement of the sliding carriage 6 around the joint 8 relative to the intermediate lever 10, which is possible up to then, is prevented. In the course of the further opening movement, the sliding carriage 6 follows the intermediate lever 10 which is a component of the multijoint consisting of the hinge bow 7, the control lever 11, the intermediate lever 10 and the body flange 4.

The second section 53 of the guide track can, as shown in the drawings, extend in a straight line and parallel to the guide rail 5. As explained, no relative rotary movement then takes place between the sliding carriage 6 and the intermediate lever 10 around the joint 8. It is, however, also possible to design the second section 53 of the guide track 19 in another manner to achieve a defined pivoting of the sliding carriage 6 around the joint 8 relative to the intermediate lever 10.

The completely open position of the sliding door 1 is shown in FIGS. 2i and 3i. The drive rod 54 has been pivoted counter clockwise by approximately 90° around the joint 55. The guide pin 17 has reached the front closed position of the second section 53 of the guide track 19. The control lever 11 and the hinge bow 7 have been pivoted by an angle of 120° counter clockwise around the joints 13 and 9.

If the sliding door 1 should be closed, the described positions are passed through in reverse order, starting from the completely open position in accordance with FIGS. 2i and 3i. The closing movement of the sliding door 1 can be effected in that the guide rail 5 is moved forward relative to the sliding carriage 6, in a powered or manual fashion. The relative movement of the guide rail 5 is initiated by the joint 55 and the drive rod 54 into the described multijoint via the lever arm 57.

In the position in accordance with FIGS. 2e and 3e, in which the guide pin 17 leaves the rear end of the second section 53 of the guide track 19, the hinge bolt 16 enters into the U-shaped hinge link 14 and the guide pin 17 enters into the inner end of the guide track 19. In the position in accordance with FIGS. 2e and 3e, the compulsory guidance by the guidance of the guide pin 17 is ended in the second section 53 of the guide track 19 and is passed on to the compulsory guidance by the hinge bolt 16 in the hinge link 14. In the further course of the closing movement, the positions of FIGS. 2d to 2b or of FIGS. 3d to 3b are passed through until, finally, the completely closed position of FIGS. 2a and 3a is reached. During this movement, the sliding door 1 is guided in a completely compulsory manner by the described multijoint, the lever arm 57 and the drive rod 54 as well as by the hinge bolt 16 and the hinge link 14. The first section 52 of the guide track 19 is designed such that it follows the path of the guide pin 17 produced by this compulsory guidance.

Figure 1B:
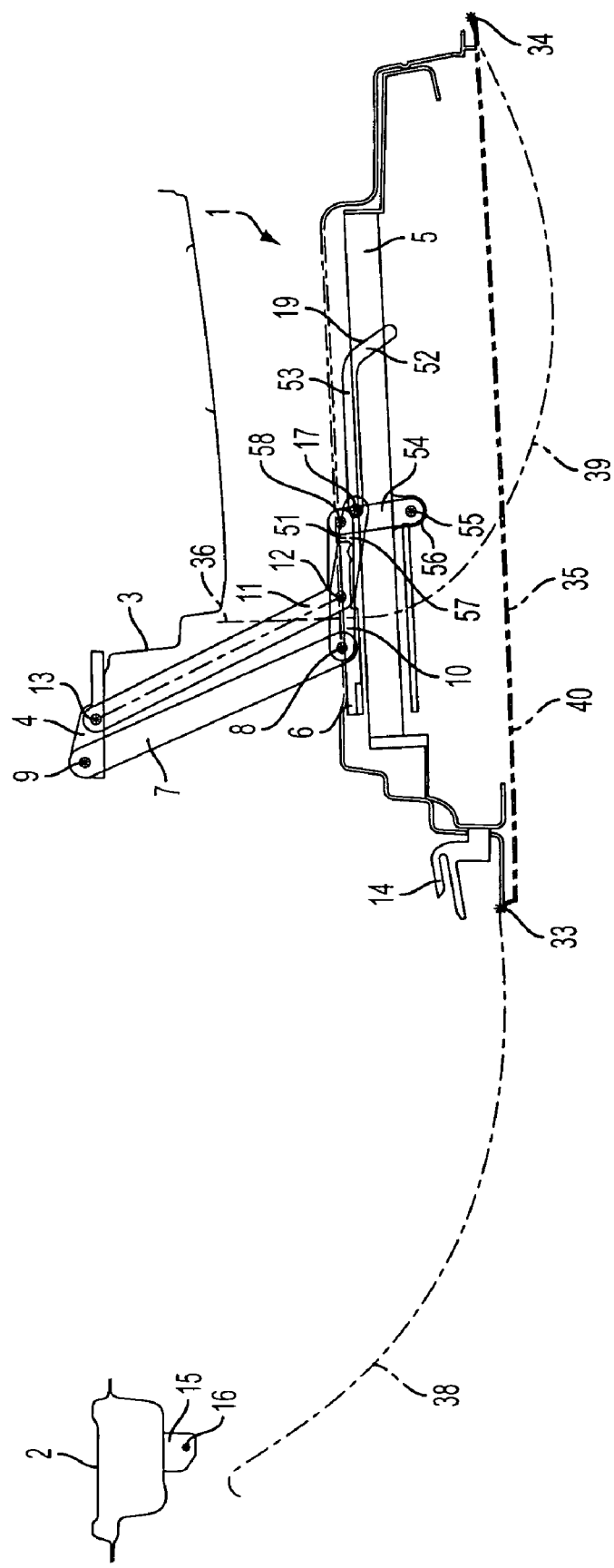

The paths of the front end 33 and of the rear end 34 of the outer door panel 35 are drawn in FIGS. 1a and 1b. During the first part of the opening movement in which the sliding door 1 is substantially pivoted around the hinge bolt 16, the front end 33 does not move at all, or moves only slightly, and the rear end 34 is moved outwardly away from the body substantially at right angles, as shown by the line 36.

In the second part of the opening movement of the sliding door 1, the front end 33 of the outer door panel 35 moves along a substantially arcuate line 38 which has a relatively large radius. The rear end 34 moves along the arcuate line 39 with a smaller radius. The outer door panel 35 adopts the position of the line marked by 40 at the end of the second part of the opening movement.

It is made possible by the present disclosure to open and close the sliding door by the initiation of a single movement. The sliding door can in particular be opened and closed by a movement of the guide rail 5 relative to the sliding carriage 6. The movement of the guide rail 5 can be initiated by the drive rod 54. It is, however, also possible to rotate the hinge bow 7 around the joint 9 in a powered or manual manner and to initiate the movement in the sliding door in this manner. It is furthermore possible to drive another component of the described multijoint in a powered or manual manner.

In other previously known solutions, it is necessary to initiate two movements into the sliding door 1, namely, on the one hand, a pivoting of the multijoint consisting of the hinge bow 7, the control lever 11, the body flange 4 and the intermediate lever 10 and, on the other hand, a relative movement of the guide rail 5 to the sliding carriage 6. In accordance with the present disclosure, it is sufficient only to move the guide rail 5 relative to the sliding carriage 6 or only to move a component of the described multijoint. The respective movement can be produced in a powered or manual manner. The present disclosure in particular enables a simple manual actuation of the sliding door. This is in particular also possible when a motor which is present fails due to a defect. The sliding door 1 can therefore also be opened by an emergency unlocking device.

The invention claimed is:

1. A sliding door for a vehicle, comprising:
   a guide rail;
   a sliding carriage coupled to guide rail, the sliding carriage longitudinally displaceable along the guide rail;
   a hinge bow hingedly coupled to the sliding carriage and the hinge bow hingedly coupled to a body flange;
   an intermediate lever hingedly coupled to the sliding carriage;
   a control lever hingedly coupled to the intermediate lever and the control lever hingedly coupled to the body flange; and
   a drive rod hingedly coupled to the control lever and the drive rod hingedly coupled to the guide rail, wherein the drive rod is pivotable about an axis which is fixed relative to the guide rail.

2. The sliding door in accordance with claim 1, wherein the sliding door includes a first longitudinal end and a second longitudinal end different from the first, the hinge bow coupled to the sliding door at the first longitudinal end and wherein the sliding door includes a U-shaped hinge link at the second longitudinal end, the U-shaped hinge link engaging with a hinge bolt on a pillar of the vehicle when the door is closed.

3. The sliding door in accordance with claim 1, wherein the control lever has a lever arm hingedly coupled to the drive rod.

4. The sliding door in accordance with claim 1, wherein a guide pin is coupled to the intermediate lever and where the guide pin is guided in a guide track.

5. A system for a vehicle, comprising:
   a sliding door having a guide rail, a sliding carriage coupled to the guide rail, the sliding carriage longitudinally displaceable along the guide rail, a hinge bow hingedly coupled to the sliding carriage and hingedly coupled to a body flange, an intermediate lever hingedly coupled to the sliding carriage, a control lever hingedly coupled to the intermediate lever and the control lever hingedly coupled to the body flange, and a drive rod hingedly coupled to the control lever, wherein the sliding door includes a first longitudinal end and a second longitudinal end different from the first, the hinge bow coupled to the sliding door at the first longitudinal end and wherein the sliding door includes a U-shaped hinge link at the second longitudinal end, the U-shaped hinge link engaging with a hinge bolt on a pillar of the vehicle when the door is closed and wherein the drive rod is hingedly coupled to the guide rail, wherein the drive rod is pivotable about an axis which is fixed relative to the guide rail.

6. The system of claim 5, wherein the control lever has a lever arm hingedly coupled to the drive rod.

7. The system of claim 6, wherein a guide pin is coupled at the intermediate lever and where the guide pin is guided in a guide track.

8. A sliding door for a vehicle, comprising:
   a guide rail;
   a sliding carriage coupled to the guide rail, the sliding carriage longitudinally displaceable along the guide rail;
   a hinge bow hingedly coupled to the sliding carriage and the hinge bow hingedly coupled to a body flange;
   an intermediate lever hingedly coupled to the sliding carriage;
   a control lever hingedly coupled to the intermediate lever and the control lever hingedly coupled to the body flange;
   a drive rod which is rotatably supported at the control lever; and
   a guide pin, coupled to the intermediate lever, the guide pin guided in a guide track;
   wherein the sliding door includes a first longitudinal end and a second longitudinal end different from the first, the hinge bow coupled to the sliding door at the first longitudinal end and wherein the sliding door includes a U-shaped hinge link at the second longitudinal end, the U-shaped hinge link engaging with a hinge bolt on a pillar of the vehicle when the door is closed, and wherein the drive rod is hingedly coupled to the guide rail, wherein the drive rod is pivotable about an axis which is fixed relative to the guide rail.

9. The sliding door in accordance with claim 8, wherein the control lever has a lever arm hingedly coupled to the drive rod.

* * * * *

UNITED STATES PATENT AND TRADEMARK OFFICE
CERTIFICATE OF CORRECTION

| | | |
|---|---|---|
| PATENT NO. | : 7,765,740 B2 | Page 1 of 1 |
| APPLICATION NO. | : 11/999786 | |
| DATED | : August 3, 2010 | |
| INVENTOR(S) | : Gerhard Heuel, Michael Krehmke and Ralf Rottmann | |

It is certified that error appears in the above-identified patent and that said Letters Patent is hereby corrected as shown below:

Col. 5, Line 63, insert --the-- before the words "guide rail".

Signed and Sealed this
Twenty-second Day of February, 2011

David J. Kappos
*Director of the United States Patent and Trademark Office*